United States Patent
Eberle et al.

(10) Patent No.: US 9,471,316 B2
(45) Date of Patent: Oct. 18, 2016

(54) USING A SINGLE-INSTRUCTION PROCESSOR TO PROCESS MESSAGES

(71) Applicant: Oracle International Corporation, Redwood City, CA (US)

(72) Inventors: Hans Eberle, Mountain View, CA (US); Hagen W. Peters, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 453 days.

(21) Appl. No.: 14/150,073

(22) Filed: Jan. 8, 2014

(65) Prior Publication Data

US 2015/0193233 A1    Jul. 9, 2015

(51) Int. Cl.
*G06F 9/00* (2006.01)
*G06F 9/30* (2006.01)

(52) U.S. Cl.
CPC ......... *G06F 9/3016* (2013.01); *G06F 9/30007* (2013.01)

(58) Field of Classification Search
CPC .......................... G06F 9/30007; G06F 9/3016
See application file for complete search history.

(56) References Cited

U.S. PATENT DOCUMENTS

2013/0339648 A1*  12/2013  Zetterman .............. G06F 9/463
                                                                711/170

OTHER PUBLICATIONS

Wikipedia: "Transport triggered architecture" http://en.wikipedia.org/wiki/Transport_triggered_architecture, collected online Jun. 11, 2014.
ht-labs.com: "Move Processor-Simple processor based on the TTA concept" last updated: Sep. 2004, -http://www.ht-lab.com/freecores/move/move.html, collected online Jun. 11, 2014.
Tampere University of Technology and Contributors: "TTA-Based Co-design Environment" About Transport Triggered Architectures, 2002-2013, https://tce.cs.tut.fi/tta.html, collected online Jun. 11, 2014.
University of Toronto: "Simple one-bus CPU architecture" http://www.cdf.toronto.edu/~ajr/258/notes/micro/one-bus.html, collected online Jun. 11, 2014.
University of Toronto: "Simple two-bus CPU architecture" http://www.cdf.toronto.edu/~ajr/258/notes/micro/two-bus.html, collected online Jun. 11, 2014.
University of Toronto: "Simple three-bus CPU architecture" http://www.cdf.toronto.edu/~ajr/258/notes/micro/three-bus.html, collected online Jun. 11, 2014.

(Continued)

*Primary Examiner* — Zachary K Huson
(74) *Attorney, Agent, or Firm* — Park, Vaughan, Fleming & Dowler LLP; Mark Spiller

(57) ABSTRACT

The disclosed embodiments describe single-instruction processors that operates upon messages received from a network interface. A single-instruction processor comprises a register file, a functional unit, a bus connecting the register file and the functional unit, and a format decoder that receives messages from a network interface. This single-instruction processor supports a single instruction type (e.g., a "move instruction") that specifies operands to be transferred via the bus. During operation, the format decoder is configured to write a parameter from a received message to the register file. A move instruction moves this parameter from the register file to the functional unit via the bus. The functional unit then uses the parameter to perform an operation.

20 Claims, 29 Drawing Sheets

(56) References Cited

OTHER PUBLICATIONS

Maxim Integrated Products, Inc.: "Introduction to the MAXQ Architecture" May 10, 2004, http://www.maximintegrated.com/en/app-notes/index.mvp/id/3222, collected online Jun. 11, 2014.

Tampereen Teknillinen Yliopisto: "Workshop on Transport Triggered Architectures" Nov. 25-26, 2002, Nokia Research Center, Finland, http://www.cs.tut.fi/~move/TTAcover.html, collected online Jun. 11, 2014.

Jaakko Sertamo: "Processor Generator for Transport Triggered Architectures" Tampere University of Technology, Department of Electrical Engineering, Aug. 20, 2003, http://www.cs.tut.fi/~move/doc/processor_generator_for_TTA.pdf, collected online Jun. 11, 2014.

Tampereen Teknillinen Yliopisto: "Overview and Evaluation of MOVE Project" last modified Jul. 27, 2001, Steven Roos, http://www.cs.tut.fi/~move/DelftMoveSite/MOVE/documents.html, collected online Jun. 11, 2014.

Anubis: "MOVE Processor" Apr. 28, 2001, http://everything2.com/title/MOVE+processor, collected online Jun. 11, 2014.

Douglas W. Jones: "The Ultimate RISC" Part of the Computer Architecture Online Collection, The University of Iowa, Department of Computer Science, 2004, http://homepage.cs.uiowa.edu/~jones/arch/risc/, collected online Jun. 11, 2014.

\* cited by examiner

| | | | 0x80 | | "O" | 0x42 | |
|---|---|---|---|---|---|---|---|
| | | | 0x1a | | "R" | 0x00 | |
| | | | 0x06 | | "C" | 0x00 | |
| | | | 0x00 | | "L" | 0x00 | |
| | | | 0x00 | | " " | 0x00 | |
| | | | 0x00 | | " " | 0x00 | |
| | | | 0x00 | | " " | 0x00 | |
| | | | 0x00 | | " " | 0x00 | |

USING A SINGLE-INSTRUCTION PROCESSOR TO PROCESS MESSAGES

BACKGROUND

1. Field of the Invention

This disclosure generally relates to techniques for extracting parameters from a message received on a network interface. More specifically, this disclosure relates to techniques for using a format decoder to extract parameters from a message for later processing by a message handler executing in application logic.

2. Related Art

Network communication between computing devices involves the exchange of messages. Each message has a defined structure, and receiving a message involves processing the message to determine the message boundaries, identify the message type, and extract data fields. These operations are typically performed by a format decoder that decodes a byte sequence that is being received from a network interface. The format decoder often stores such data fields in a register file (or other storage structure) and then signals a message handler that proceeds to operate upon the data fields.

Implementations of format decoders typically involve either generic software solutions or custom hardware solutions that are targeted toward a particular application and/or protocol. Targeted hardware solutions offer high throughput and low fixed latency, but can only process messages for the targeted set of protocols and applications. Generic software solutions offer more flexibility, but also often introduce a significant (and variable) amount of latency as well as a need for additional memory resources.

Hence, what is needed are techniques for receiving and handling messages that do not suffer from the above-described problems of existing techniques.

SUMMARY

The disclosed embodiments describe single-instruction processors that operate upon messages received from a network interface. A single-instruction processor comprises a register file, a functional unit, a bus connecting the register file and the functional unit, and a format decoder that receives messages from a network interface. This single-instruction processor supports a single instruction type (e.g., a "move instruction") that specifies operands to be transferred via the bus. During operation, the format decoder is configured to write a parameter from a received message to the register file. A move instruction moves this parameter from the register file to the functional unit via the bus. The functional unit then uses the parameter to perform an operation.

In some embodiments, the single instruction type consists of two fields. The first field specifies a source unit and/or a source address for an operand, while the second field specifies a destination unit and/or a destination address for the operand. After the first move instruction moves the operand to the functional unit, a subsequent move instruction moves the output generated by the functional unit to the register file via the bus.

In some embodiments, the single-instruction processor further comprises a second bus. In these embodiments, the first bus transfers input operands from the register file to one or more functional units, while the second bus transfers output operands from the functional units to the register file. A two-bus architecture increases the number of move operations that can be performed in a single clock cycle and improves routability for the two busses.

In some embodiments, the single instruction type consists of four fields: the first field specifies a source address in the register file for an input operand; the second field specifies a destination functional unit for the input operand; the third field specifies a source functional unit for an output operand; and the fourth field specifies a destination address in the register file for the output operand. In these embodiments, the move instruction moves an input operand to the functional unit while simultaneously moving an output generated by a functional unit to the register file.

In some embodiments, the single-instruction processor further comprises a second bus and a third bus. In these embodiments, the first bus transfers input operands from the register file to a first port of one or more functional units, the second bus transfers input operands from the register file to a second port of the functional units (and/or a different set of functional units), and the third bus transfers output operands from the functional units to the register file. A two-bus architecture facilitates moving two input operands and one output operand in a single processor clock cycle.

In some embodiments, the single instruction type consists of six fields: the first field specifies a first source address in the register file for a first input operand; the second field specifies a first functional unit destination for the first input operand; the third field specifies a second source address in the register file for a second input operand; the fourth field specifies a second functional unit destination for the second input operand; the fifth field specifies a source functional unit for an output operand; and the sixth field specifies a destination address in the register file for the output operand. In these embodiments, the move instruction simultaneously: moves the first input operand to a first port of a functional unit; moves the second input operand to a second port of the functional unit (and/or to another functional unit); and moves an output generated by a functional unit to the register file.

In some embodiments, the register file is a split register file that is split such that a first portion of the register file is configured to output values to the first bus and a second portion of the register file is configured to output values to the second bus.

In some embodiments, the single-instruction processor further comprises a memory. During operation, the format decoder determines a message type for a received message, and then uses the message type to load a message handler for the received message from the memory. This message handler is comprised of one or more move instructions.

In some embodiments, the format decoder uses the message type to load an annotation for a received message from the memory, and then outputs this annotation aligned with the bytes of the received message. The annotation includes an identifier that is used to determine and load the message handler. The annotation also specifies one or more register file addresses at which to store a set of message bytes that contain the desired parameter in the message. The format decoder uses the addresses in the annotation to extract and write the parameter to the register file.

In some embodiments, the move instructions that comprise the message handler are statically scheduled by a compiler that considers the message format of the message type and the annotation for the message type when scheduling the operations performed for the message handler. This compiler ensures that operations are scheduled such that parameters are available when needed by their respective operations.

In some embodiments, the single-instruction processor is independent of any specific message format, protocols, or annotation formats, and can be adjusted to support new message types. Support for new message types can be added by using program instructions to: (1) store a new annotation for the new message type to the annotation memory; (2) select message fields in the new message type that are to be used as type identifier fields; (3) store an identifier for a message handler to be invoked for the new message type; (4) store an associated message length for the new message type that can be used to detect the message boundary for the new message type; and (5) store a new message handler that performs operations for the new message type in a memory that stores message handlers. The single-instruction processor can be configured to support a new message type at runtime without needing to change the hardware of the single-instruction processor.

In some embodiments, multiple instances of the single-instruction processor are used in parallel to process multiple messages of an incoming message stream that is received from a network interface.

BRIEF DESCRIPTION OF THE FIGURES

FIG. 16 illustrates the contents of a register file after a format decoder has processed an exemplary message that follows the message structure illustrated in FIG. 15 in accordance with an embodiment.

Figure 1:
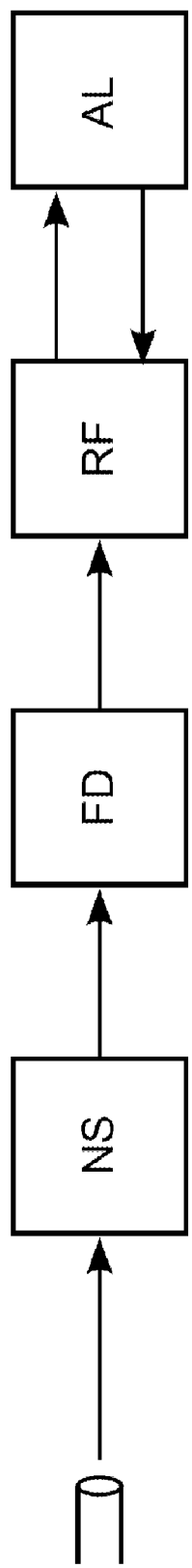
FIG. 1 illustrates an exemplary flow for processing messages in a computing device using active parameters in accordance with an embodiment.

Table 1 illustrates an exemplary message handler in accordance with an embodiment of the present invention.

Table 2 illustrates an exemplary multiplication instruction sequence for a dual-move architecture in accordance with an embodiment of the present invention.

Table 3 illustrates an exemplary multi-instruction sequence for a dual-move architecture in which moves are statically scheduled to overlap in accordance with an embodiment of the present invention.

Table 4 illustrates an exemplary multi-instruction sequence for a dual-move architecture that includes a data dependency in accordance with an embodiment of the present invention.

Table 5 illustrates an exemplary multi-instruction sequence for a three-bus architecture in accordance with an embodiment of the present invention.

Table 6 illustrates an exemplary multi-instruction sequence that utilizes every move of a dual-move architecture in accordance with an embodiment of the present invention.

Table 7 illustrates an exemplary multi-instruction sequence that utilizes every move of a triple-bus architecture in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

1. Decoding Messages

Network communication between computing devices involves the exchange of messages (i.e., byte sequences). In most communication protocols, each message has a defined structure, and receiving a message involves processing the message to determine the message boundaries, identify the message type, and extract data fields. These operations are typically performed by a format decoder that decodes a byte sequence that is being received from a network interface. The format decoder often stores such data fields in a register file (or other storage structure) and then signals a message handler that proceeds to operate upon the data fields.

Implementations of format decoders typically involve either generic software solutions or custom hardware solutions that are targeted toward a particular application and/or protocol. Targeted hardware solutions offer high throughput and low fixed latency, but can only process messages for the targeted set of protocols and applications. Generic software solutions offer more flexibility, but also often introduce a significant (and variable) amount of latency as well as a need for additional memory resources.

In contrast, some embodiments use active parameters to load message fields into a register file. More specifically, message parameters are identified and associated with "annotations" that specify actions to be performed on parameter values. For instance, such annotations may specify a target register file location for a parameter and/or an action that should be initiated upon receiving a given message field. In such embodiments, a format decoder that is implemented in hardware operates on a parallel data bus at very high speed (and with very low fixed latency), but can still be configured via an "annotation memory," and hence can be used for different types of (and changes to) fixed-offset message protocols. Note that techniques that use active parameters are distinct from alternative techniques that use a finite state machine or microcontroller to parse a message and extract message fields.

FIG. 1 illustrates an exemplary flow for processing messages in a computing device using active parameters. Consider a set of messages that are received by the network interface card (NIC) of a computing device. A format decoder (FD) receives a data stream containing messages from the network stack (NS), and extracts from each message the set of parameters that are needed to process the message. These parameters are then passed on to a message handler that executes in the application logic (AL) via a register file (RF). In this flow, the FD uses annotations stored in memory to obtain the information needed to parse the message, extract a set of parameters, and then store these parameters in the register file. The illustrated data path facilitates processing messages with minimal and fixed processing times; this data path does not involve any buffer memory or flow control that could introduce variable forwarding delays.

Note that the disclosed techniques can apply to bit-parallel data paths that are implemented in hardware; parallel processing may be needed when the bit rate of the network link for the computing device exceeds the hardware clock rate of the computing device. In such scenarios, the NS receives a bit-serial stream from the network and parallelizes this stream before it is passed on to the FD. For example, a 10 gigabit/s bit-serial data stream might be parallelized into 64-bit (or 8-byte) wide words, with the FD and the AL implementing 64-bit data paths that process 64 bits of the message every clock cycle. Note also that while the subsequent exemplary implementations implement aspects of the FD, RF, and AL in hardware, some or all of this functionality might also be implemented using program instructions.

In some embodiments, the disclosed techniques are applied to fixed-offset message protocols. In the context of computer networking, messages are byte sequences with a defined structure that are exchanged between a sender and a receiver. Using this definition, the term "message" may not strictly refer to a particular formal packet specification but, for example, could also refer to only the header of a packet, followed by another message carrying the payload of the packet. Many messages used in computer networks have a fixed, static structure (i.e., messages have a fixed length and consist of a fixed sequence of fixed size fields). In "fixed-offset" message protocols, all of the fields contained in such a message start and end at a known offset relative to the first byte of the message. Many application protocol messages fall into this category, as do a number of other widely used protocols, such as ARP for IP over Ethernet (an address resolution protocol). Furthermore, many Internet protocols use at least fixed-offset headers (which may themselves be handled and/or be considered as separate messages).

2. A Configurable Format Decoder

In some embodiments, a protocol-agnostic hardware implementation of an FD that can be configured using program instructions is used to decode messages that use fixed-offset protocols. During operation, this FD is configured to:

1. decompose incoming byte sequences into messages (i.e., detect message boundaries);
2. recognize different message types for one or more network protocols;
3. extract and store a set of parameters from a received message; and
4. trigger actions to be taken based on the structure and parameters of the received message.

In some embodiments, an FD does not directly separate an incoming message into its specific message fields, but instead associates the bytes of the incoming message with an annotation that is based on the incoming message's type. More specifically, the annotation for all of the bytes of a message of type t is referred to as the annotation of message type t, and an incoming message of type t is associated with the respective annotation for this type such that byte i of the message (e.g., B(t,i)) is associated with an annotation value A(t,i). Annotations for each supported message type can be stored in memory and can be written (or modified) using program instructions. Hence, the output of the FD consists of: (1) a stream of bytes that were received from a network source; and (2) an accompanying aligned annotation stream that was obtained from a software-configurable memory.

Figure 2:
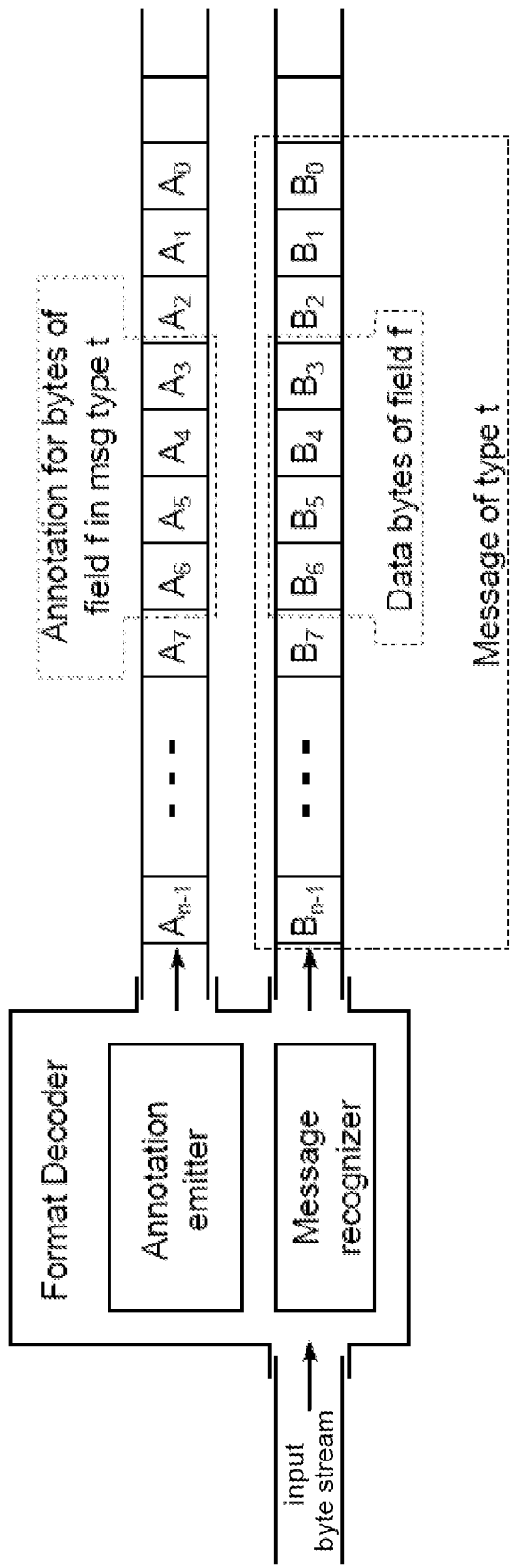
FIG. 2 illustrates the process of outputting an annotation for a message in accordance with an embodiment.

FIG. 2 illustrates the process of outputting an annotation for a message. In FIG. 2, an FD receives a byte stream as input, recognizes and delineates incoming messages in the incoming byte stream, and then loads the respective annotation for the bytes of each message. As the FD outputs the bytes of the message, it also emits this annotation in alignment with the message bytes. For instance, as illustrated, when the FD outputs a message of type t (e.g., bytes $B_0, \ldots, B_{n-1}$), it also outputs the respective annotation for that message type (e.g., annotations $A_0, \ldots, A_{n-1}$, which are aligned with the message bytes). In the illustrated example, a field f in the message comprises message bytes $B_3, \ldots, B_6$, and is aligned with annotations $A_3, \ldots, A_6$. The aligned FD outputs (e.g., the data bytes and their accompanying annotations) can then be used as inputs for subsequent processing modules. For example, the bytes of a message of type t may be passed to a memory module that uses the accompanying annotations for each byte as the address in the memory module to which the byte should be stored. In the context of FIG. 2, this approach might involve extracting field f from the message by having annotations $A_3, \ldots, A_6$ indicate appropriate target memory locations. In this manner, the process of splitting an incoming message into fields can be managed by the FD by specifying a software-configurable annotation stored in an annotation memory.

Note that techniques that attach annotations to message bytes can be applied to a range of different applications and behaviors. For instance, annotations can be used to selectively forward or drop single message bytes, message fields, and/or entire messages. Moreover, such annotations could also be used for byte-wise routing. Other examples might involve including and/or excluding parts of a message in subsequent operations (e.g., in checksum operations) or replacing particular parts in a message (e.g., replacing addresses or identifiers in gateway or tunneling scenarios).

Figure 3:
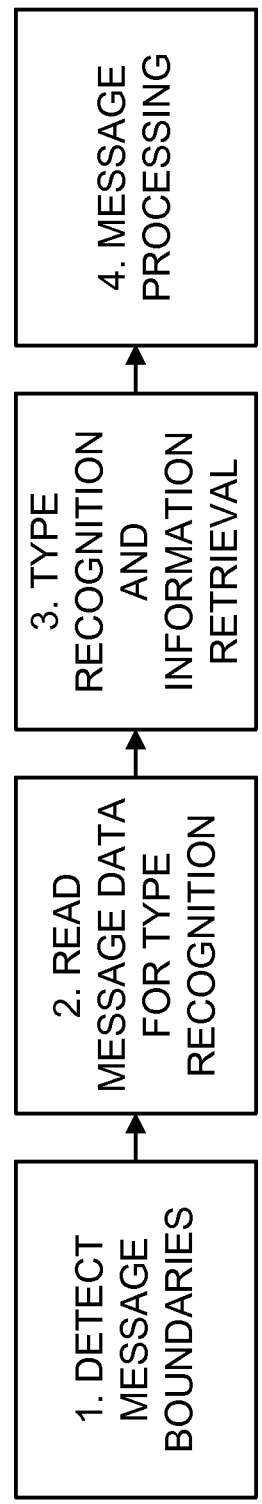
FIG. 3 illustrates the actions performed by a format decoder in accordance with an embodiment.

FIG. 3 illustrates the steps that are performed by an FD. During operation, the FD needs to:

1. Detect message boundaries (i.e., the start and end of messages). For fixed-offset messages, a message of a particular type has a known fixed length. Thus, the FD can determine the start of the next message based on the type (and specified length) of the current message. An FD may assume that the first message in a byte stream starts with byte 0 or at some other known offset. In some embodiments, message formats may be defined to always have unit byte lengths.
2. Read message data for type recognition. Typically, fixed-offset application-level protocol messages contain one or more type identifier fields; the set of message bits that are examined by the FD for type recognition may be configurable (e.g., using software) based on the set of supported message types. Once the FD determines where a message starts in the byte stream, it can begin reading the set of bits that serve as potential type identifiers from the specified positions in the new message.
3. Perform type recognition and information retrieval. After reading the type identifier bits from a message, the FD then inputs the identifier into a structure (e.g., a CAM, or content-addressable memory) to look up message-related information such as the message length, the address of the annotation for this message in an annotation memory, and a set of appropriate action(s) to be taken for the message. Note that a lookup CAM may also be set up and configured using software.
4. Process the message. After determining the message type and appropriate annotation for a message, the FD outputs the message bytes and the aligned message annotation (that was read from the address in the annotation memory that was determined in the previous step).

Note that in a fully pipelined design the FD in this example can process incoming data at the full rate of 8 bytes per cycle. Although the illustrated four steps are processed sequentially for a single message, multiple messages may be processed in parallel (e.g., the FD may output a first message while concurrently retrieving information for a subsequent message). Note also that a range of memory architectures may be used to support a highly configurable FD. For example, one architecture might use two memories, where the first memory is a message information memory that stores general message information (e.g., definitions of message types and lengths and corresponding pointers to an annotation memory), and the second memory is the annotation memory that stores per-message-byte information for each supported message type. In other architectures, this information may be stored in a single shared memory structure.

Figure 4:
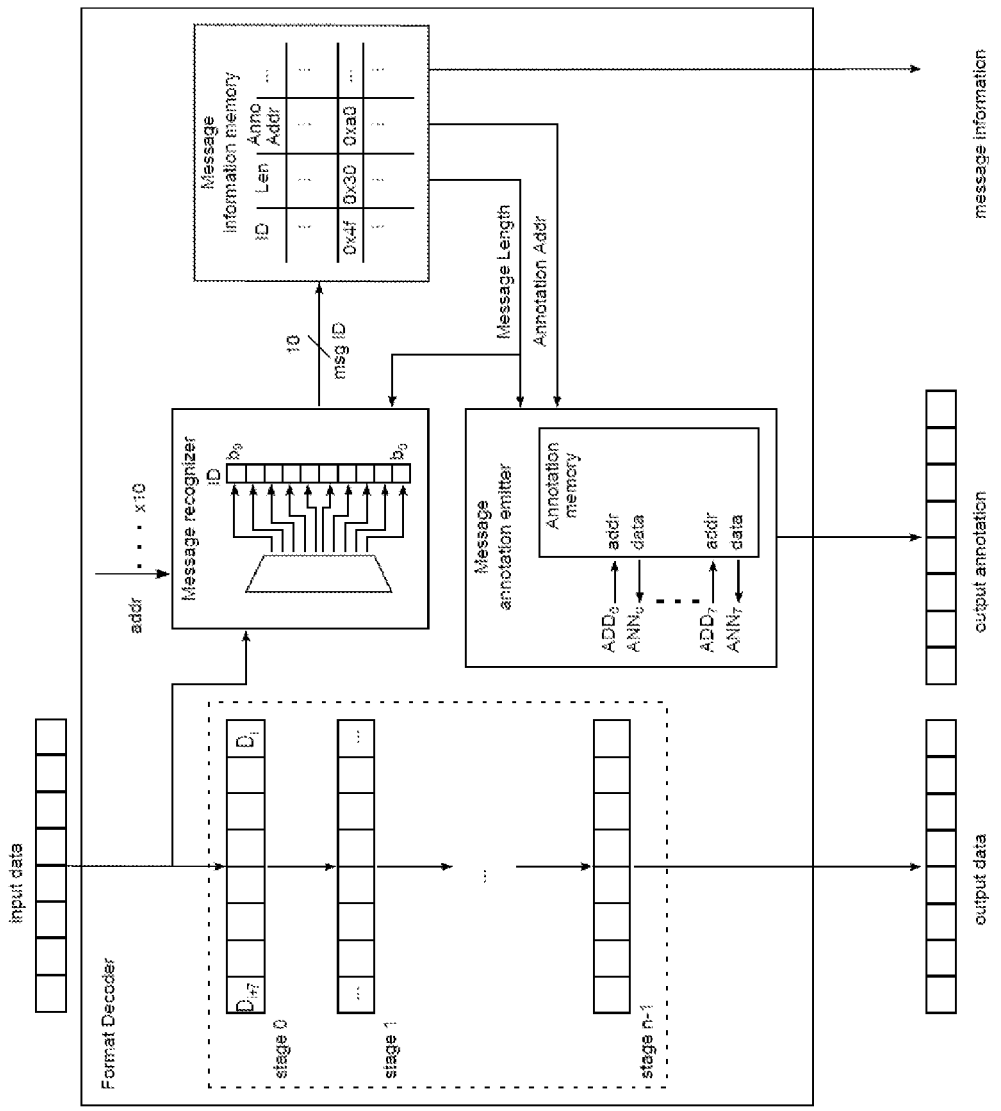
FIG. 4 illustrates an exemplary pipelined architecture for a format decoder in accordance with an embodiment.

FIG. 4 illustrates an exemplary pipelined architecture for a FD. An eight-byte word that is input to the FD is streamed into the first stage of a pipeline (stage 0) as well as into a message recognizer unit. The length of the pipeline is adjusted according to the time needed to recognize a message type, retrieve the message information, and load the corresponding annotation for the message. The message recognizer is configured (e.g., using program instructions that store message type information into a memory) for a particular protocol (or set of protocols); the configuration process typically involves determining and selecting the message bits for each supported message type that need to be inspected to perform type recognition. Protocols that support more than one message type typically place fields that are needed to recognize the message type within the first few bytes of the message, but this is not required; a range of message bytes may be examined to determine an associated protocol and message type. For example, if a set of ten message bits that are distributed across the first eight bytes are used to differentiate the set of supported message types, determining the message type may involve inspecting a set of ten address fields from these first eight bytes in the recognizer unit. Note that in general messages are not aligned with eight-byte words, and that the set of bits that need to be inspected for type recognition may not be within the first eight bytes of a message. The recognizer unit looks at the data words for a message as they stream through, and can pick the bits that are needed from one or more words of a message.

In some embodiments, the hardware structures that are used to perform message type recognition may vary depending on an expected set of protocols and message formats. For instance, if the message type will always be specified in the first eight bytes of a message, the first eight bytes of each message may be used as a 64-bit key to find an entry in a CAM. In implementations with a limited-size CAM, a smaller set of bits and/or bytes that are used for message recognition might be masked (such that unneeded bits and bytes are zeroed out) during this process. Alternatively, implementations that need to consider only two (or fewer) bytes of identifying information may benefit from less complex message identification logic. For instance, in such implementations the selection of bytes that include identification information may be performed by protocol setup logic inside the recognizer unit, which then uses the two selected message bytes as 16-bit keys to access a less complex CAM or as an index into a table.

After gathering the type-identification bits from the message, the recognizer unit inputs these identifiers into the message information memory, which performs a lookup to determine the message type, message length, and the location for a corresponding annotation for the message type. This message length and the start address of the annotation are then fed into a message annotation emitter. In this example, the FD processes one eight-byte word per cycle; hence, the annotation emitter loads and outputs eight annotations from the annotation memory in every cycle. Because message boundaries are not aligned with eight-byte words, the annotation emitter may output annotations for bytes from two different messages in the same cycle. Note that, as illustrated, the message length is also fed back to the recognizer unit to facilitate detecting the end of the current message and the beginning of the next message. Other message information, such as the appropriate action to be taken for the respective message, is also passed on to subsequent processing units. For example, the action can specify which type of processing unit should be chosen for processing the extracted message data.

In some embodiments, FD architectures that align incoming data with annotations are agnostic to message formats and fields within messages. More specifically, the FD logic does not depend on a particular protocol, message definitions, or annotation formats. Instead, any parameters that are specific to a particular protocol and/or message type can be configured by software program instructions (e.g., as described above, message information describing message length, actions, and annotations are stored in a memory, and can be re-configured as needed). These capabilities allow one FD instance to process different protocols by using different memory values and different protocol setup inputs.

Furthermore, because multiple message and protocol configurations can simultaneously be stored in a memory, the FD can switch from one configuration to another on a per-message basis by reading message information and annotation from different memory addresses. Having all information related to the protocol and the messages in memory instead of hard-wired logic facilitates adding, removing or altering the contents of the memory (and hence the configuration for message handling) during runtime.

Note that the exemplary FD of FIG. 4 is configured to process data at a rate of eight bytes per cycle. To keep up with this data rate, the FD needs to be able to output eight bytes per cycle on average. Given that condition, any technique that requires the alignment of messages or, even worse, the alignment of message fields to eight-byte words requires additional resources and bandwidth, and may even delay the processing of a message. An agnostic FD architecture, however, just emits annotations (i.e., execution parameters and instructions for each byte), and hence does not involve aligning messages or message fields to eight-byte words. For example, consider field f of message type t in FIG. 2, which is to be stored at memory addresses $A_3, \ldots, A_6$; it does not matter where exactly within an eight-byte word the four bytes of field f are located, nor does it matter whether or not the FD receives the four bytes off in one or two cycles. As long as bytes $B_3, \ldots, B_6$ are correctly aligned with their annotations $A_3, \ldots, A_6$, subsequent operations will be processed correctly.

3. A Register File that Supports Annotated Messages

Figure 5:
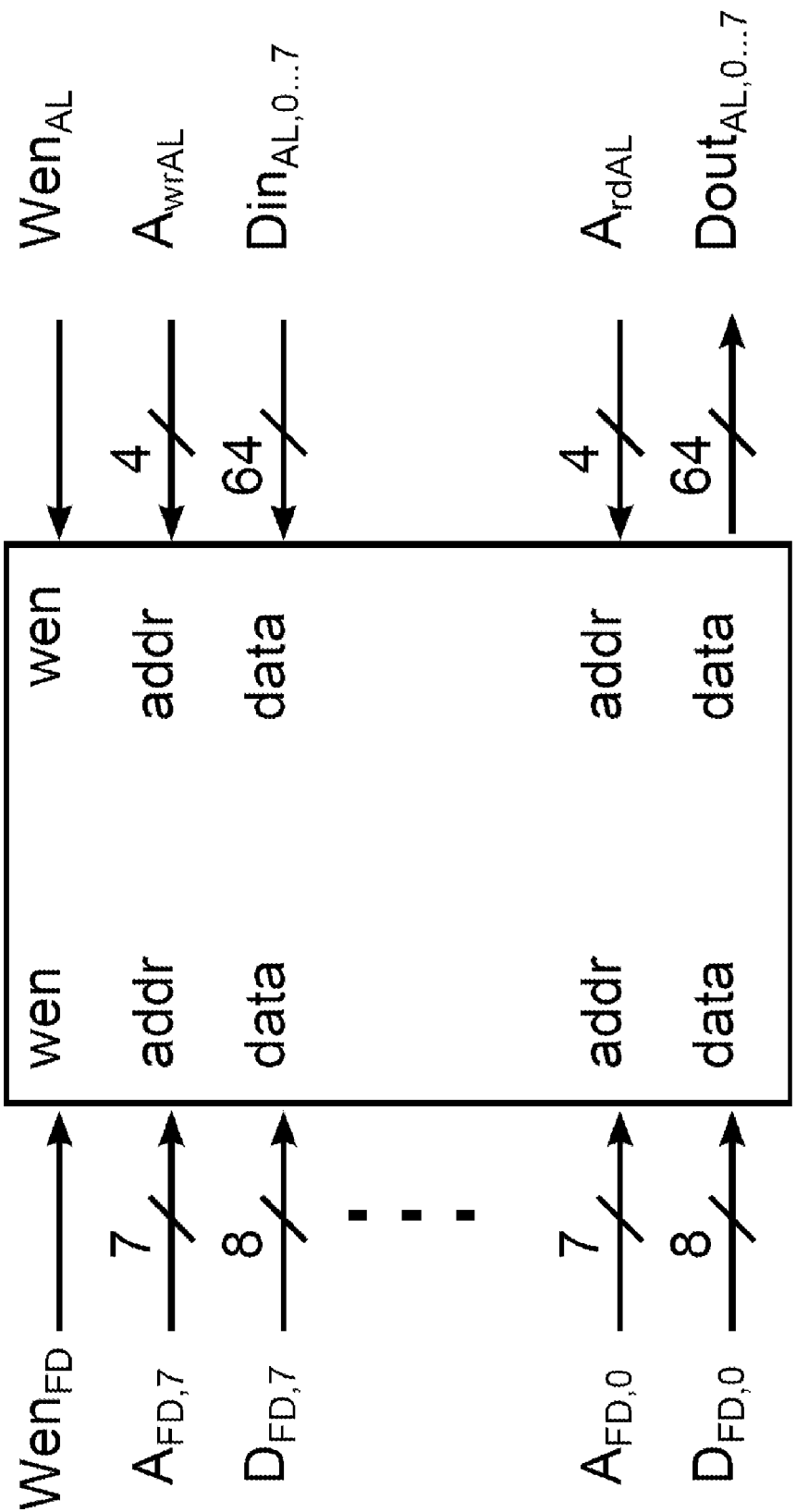
FIG. 5 illustrates the port interfaces for an exemplary register file in accordance with an embodiment.
Figure 6:
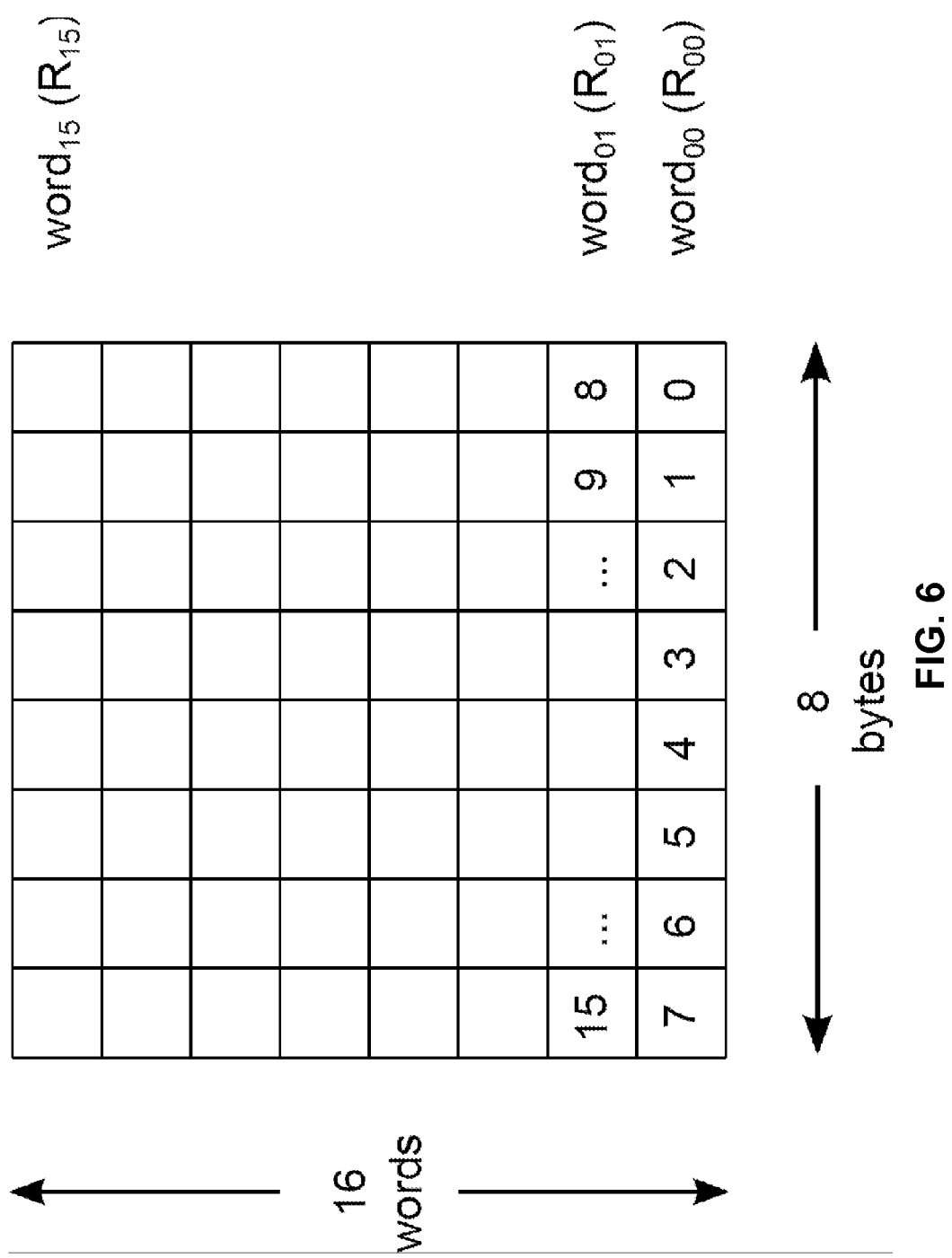
FIG. 6 illustrates the storage layout of an exemplary register file in accordance with an embodiment.

As illustrated in FIG. 1, message data is forwarded from the FD to the AL via a register file (RF). The port interfaces for an exemplary RF that holds 128 bytes are illustrated in FIG. 5, while the storage layout of this exemplary RF is illustrated in FIG. 6. As illustrated in FIG. 5, the RF has a set of write ports for the FD and separate read and write ports for the AL. On the FD side, the RF is byte-addressable, with eight write ports that are each one byte wide. Each of these (FD-accessible) write ports includes a data input byte and a target address (e.g., $D_{FD,7}$ and $A_{FD,7}$, respectively, for data byte write port seven) and a write-enable bit ($Wen_{FD}$) that enables writes. On the AL side, the RF is 64-bit word-addressable (as illustrated in FIG. 6). More specifically, the read and write ports for the AL each access a 64-bit data word (e.g., $Dout_{AL,0 \ldots 7}$ and $Din_{AL,0 \ldots 7}$, respectively) using a four-bit address ($A_{rdAL}$ and $A_{wrAL}$, respectively), with a write-enable bit ($Wen_{AL}$) controlling writes for the write port. Hence, accesses by the AL are 64-bit word-aligned (i.e., a byte written by the FD to address a is located in the word at address a div 7 at byte position a mod 7 when accessed by the AL).

Figure 7:
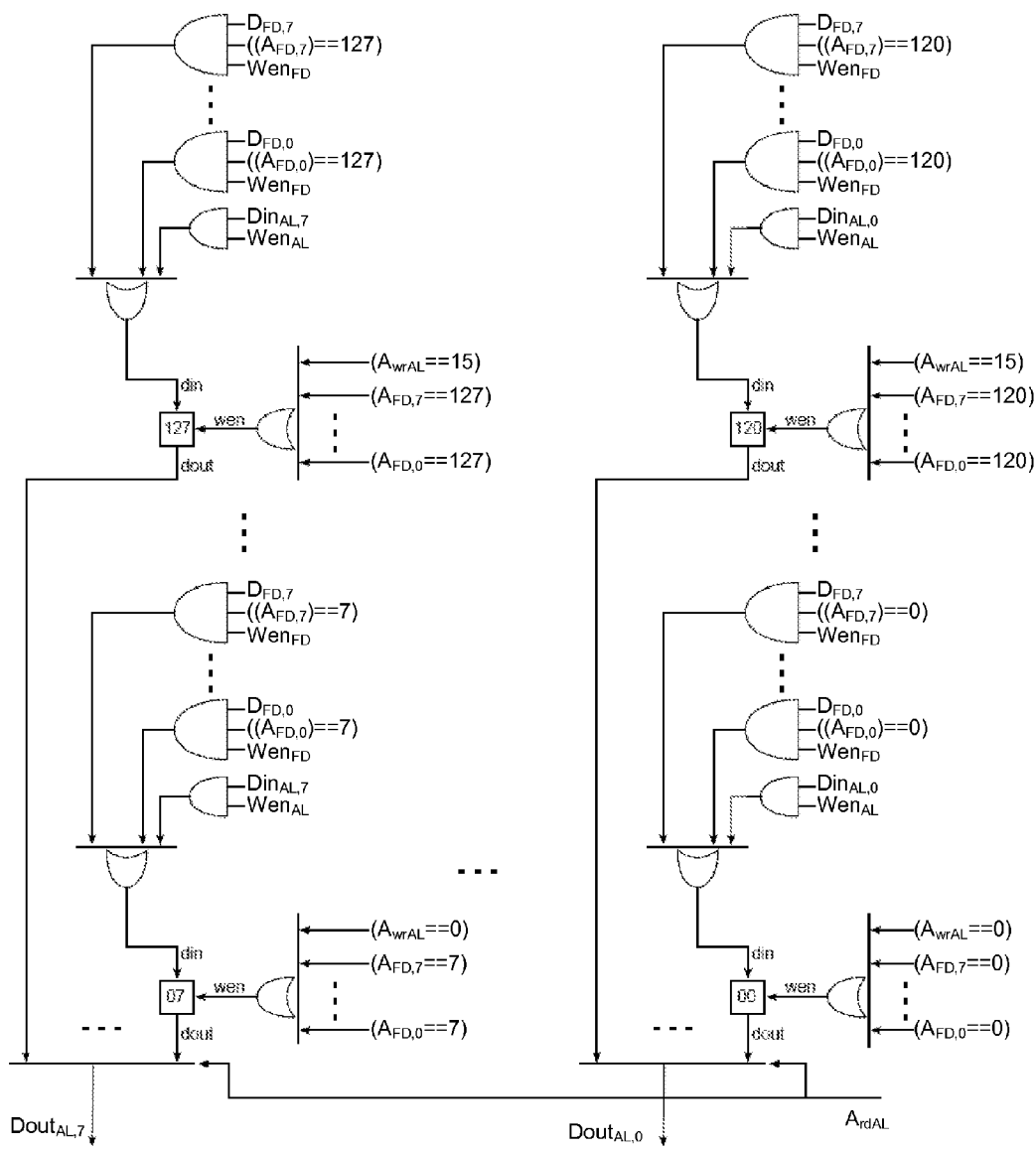
FIG. 7 illustrates an exemplary implementation for the register file of FIGS. 5-6 in accordance with an embodiment.

FIG. 7 illustrates an exemplary implementation of the RF illustrated in FIGS. 5-6. Note that FIG. 7 uses the same signal names for the port interfaces illustrated in FIG. 5, and illustrates an exemplary gate-level implementation for representative register bytes 00, 07, 120, and 127 (e.g., the register bytes for the four corners of the storage layout illustrated in FIG. 6); substantially similar gate implementations can be extrapolated across the other register bytes based on these four representative examples, and are hence not illustrated.

Writing from the AL to the RF is straightforward; the AL always writes a 64-bit word into an eight-byte row of the RF. Thus, each byte of the data input port maps to one of the eight columns. Consider the input for register byte 120 (e.g., the top-right of the four illustrated register bytes) during a write to word address 15 of the RF: in this scenario, the AL's write enable signal, $Wen_{AL}$, is logically ANDed together with $Din_{AL,0}$, which corresponds to byte zero of the AL's write port, while the address field $A_{wrAL}$ is set to word address 15, thereby enabling the write to the storage cell for register byte 120. Substantially similar configuration logic is triggered for the other register bytes in the row (i.e., register bytes 121-127), thereby enabling the write of the word to the entire row (i.e., to the register). For reads, the clout outputs of the register bytes for each row are input to a 16:1 multiplexer, and the row to be output is selected by the AL's read address ($A_{rdAL}$).

Writing to the RF from the FD is slightly more complex. During each clock cycle, up to eight bytes of data can be transferred from the FD to any of the 128 register bytes of the register file. Each byte is accompanied by an annotation value that specifies the destination byte address in the RF. There are no constraints on the destination byte addresses supplied to the RF; the eight bytes being transferred can be copied into arbitrary, but unique, register byte locations in the RF (e.g., the implementation may be configured to disallow multiple ports from simultaneously writing to the same register byte). In the implementation of FIG. 7, an AND term (e.g., an and gate) for each FD port $D_{FD,0 \ldots 7}$ passes a data byte to a given register byte cell if a comparator determines a match for its given address (e.g., with the comparator outputting all ones if the address condition is met) and the write enable signal $Wen_{FD}$ is enabled. The outputs of the resulting nine AND terms are ORed together before they are input to the din for the register byte cell, and the write enable for each register byte is controlled by an OR term that considers the full set of addresses received from the FD and AL. For instance, consider a write by the FD to register byte 120 using port $FD_3$: the target address $A_{FD3}$ is set to 120 and write enable $Wen_{FD}$ is set, thereby enabling data byte $D_{FD,3}$ to be passed on to the din port of register byte cell 120. Because $A_{FD3}$ equals 120 (e.g., $A_{FD,3}==120$ is true), the OR gate controlling the write enable (wen) for register cell 120 is also activated, allowing data bytes $D_{FD,3}$ to actually be written into register byte cell 120. Note that while FIG. 7 illustrates performing a comparison again the received address at each cell, the comparison logic for register byte cells can be simplified by sharing aspects of address decoding across rows and/or columns of register byte cells.

In some embodiments, annotations provide a way to separate and select portions of message fields on an as-needed basis. For instance, although messages typically consist of fields that span multiple bytes, per-message-byte annotations facilitate ignoring an overlaying message format that ties bytes together into specified multi-byte message fields. FIGS. 8-11 illustrate how message fields might be stored in an exemplary RF by annotations associated with several exemplary messages. Note that some message fields may not be needed. Hence, in some embodiments, a portion of the RF address space may be used as destinations for message bytes that are to be discarded (e.g., not used as parameters for the handler), and therefore might not involve actual storage registers.

Figure 8:
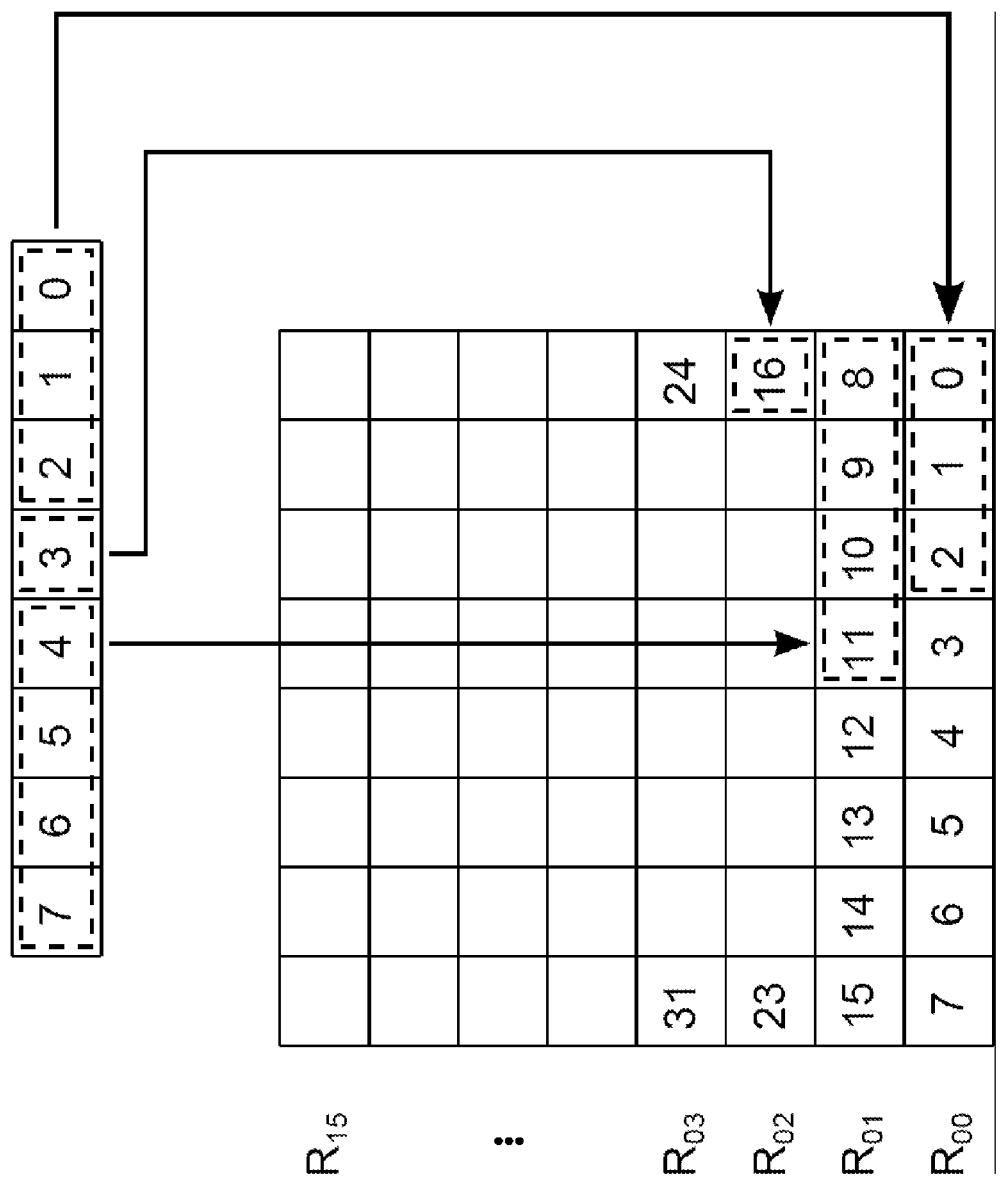
FIG. 8 illustrates how the message fields for an exemplary message are stored in a register file in accordance with an embodiment.

In the exemplary RF of FIG. 8, RF bytes 0 to 7 are used to discard unneeded message bytes. In the illustrated example, message bytes 0-2 are copied into RF bytes 0-2 (i.e., message bytes 0-2 are discarded), message byte 3 is copied into RF byte 16, and message bytes 4-7 are copied into RF bytes 8-11. Message bytes 4-7 may, for example, represent a 32-bit integer value and message byte 3 may represent a one-character ASCII value. The AL may read these parameters by first reading message bytes 4-7 in one RF word, $R_{01}$ (also referred to as register 1), and then reading message byte 3 by reading RF word $R_{02}$ (also referred to as register 2). Providing byte-addressability on the FD side facilitates aligning parameters such that the AL can access individual parameters as 64-bit words.

Figure 9:
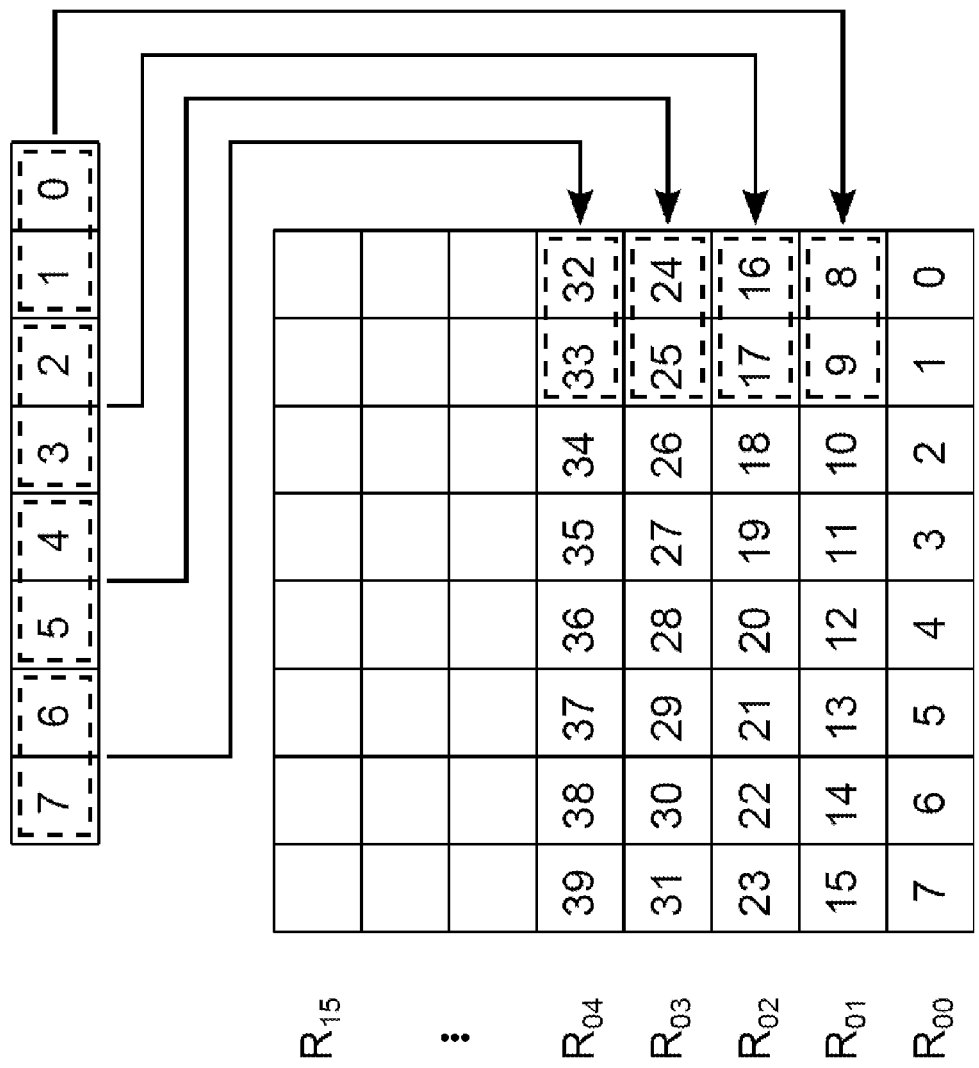
FIG. 9 illustrates a message decoding operation in which annotations are used to copy four 16-bit fields from a message into four different registers of a register file in a single cycle in accordance with an embodiment.

FIG. 9 illustrates another exemplary decoding operation in which annotations are used to copy four 16-bit fields from a message (e.g., representing four 16-bit integers) into four different registers in a single cycle.

Figure 10:
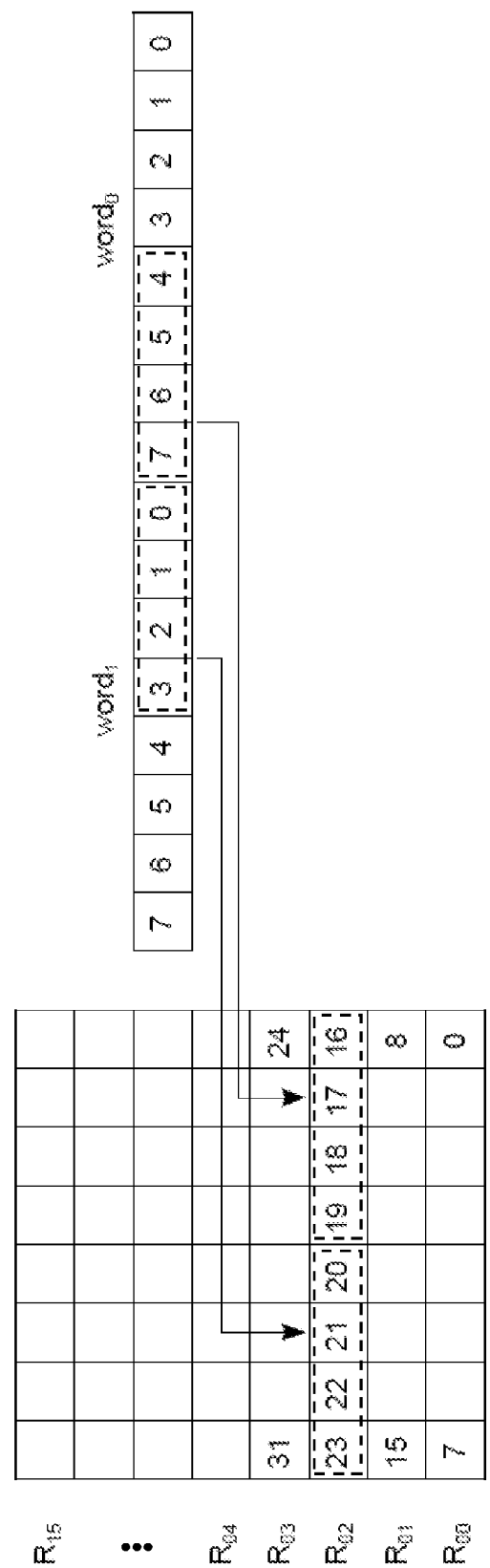
FIG. 10 illustrates a message decoding operation in which annotations are used to assemble a parameter from two separate words of a message into a single register of a register file in accordance with an embodiment.

FIG. 10 illustrates an example in which a parameter is assembled from subsequent words output by the FD. Specifically, a first set of bytes (bytes 4-7) of message word 0 are copied into RF bytes 16-19, and then, subsequently, bytes 0-3 of the next message word 1 are copied into RF bytes 20-23. RF bytes 16-23 can then be accessed by the AL as $R_{02}$ in one cycle.

Figure 11:
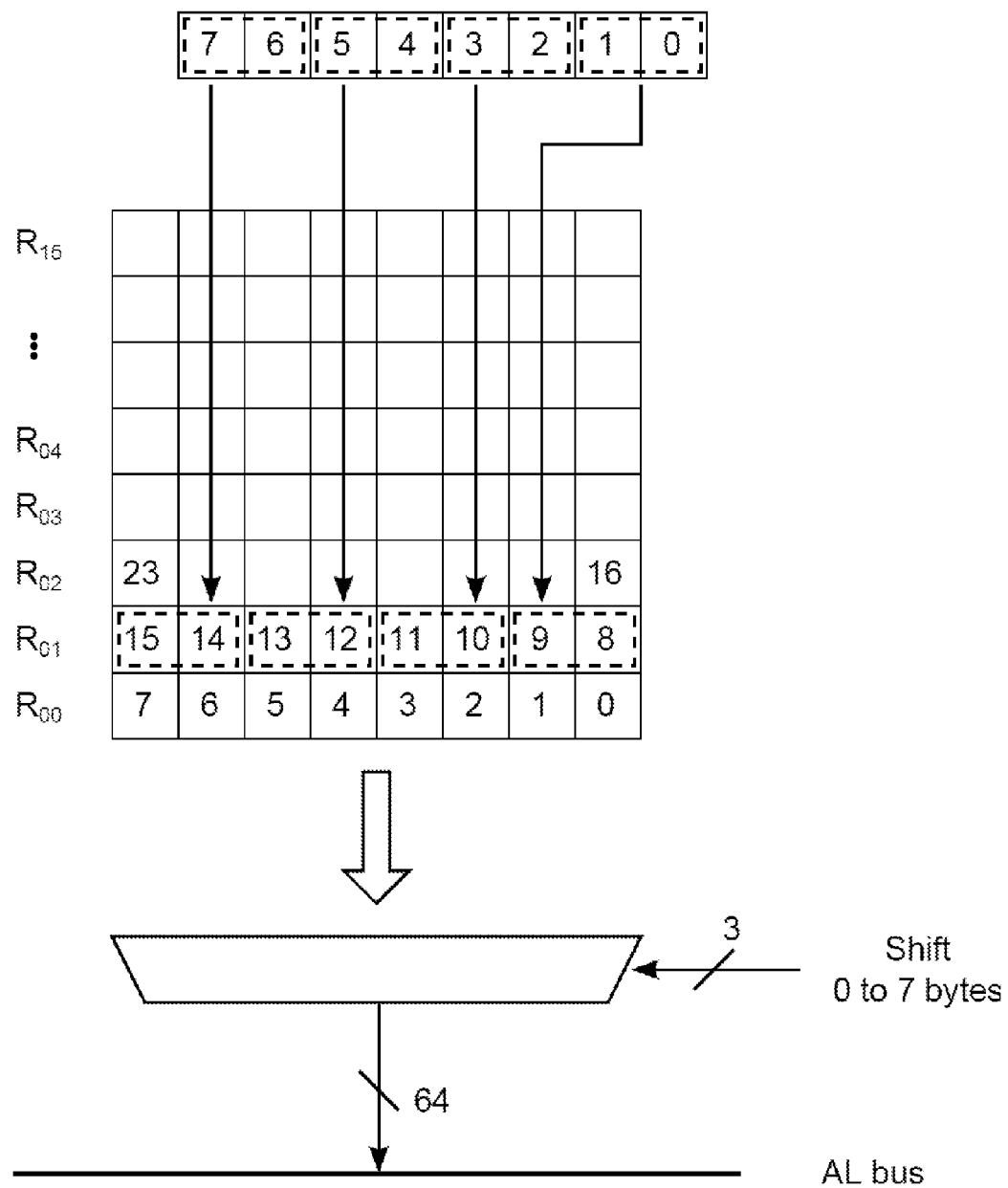
FIG. 11 illustrates a message decoding operation in which annotations are used to write four 16-bit fields from a message into a single register of a register file in accordance with an embodiment.

While the exemplary decoding operation of FIG. 9 separates four fields into four different registers of the RF, FIG. 11 illustrates an alternative configuration in which the four parameters are densely packed into the RF and a separate alignment network is provided at the output of the RF for AL accesses. More specifically, rather than storing the four 16-bit parameters in four different 64-bit registers and leaving four sets of 48 register bits unused, all four parameters are instead densely packed into the same 64-bit register. A shifter in the output path of the RF aligns the 16-bit values with the data path of the AL so that they can be accessed one at a time; note that a shifter is needed in the read path as well as in the write path. The two design choices illustrated in FIGS. 9 and 11 have respective advantages and disadvantages. In the first design, accesses by the AL are faster, as no additional delay is introduced by a shifter. However, when parameters are smaller than the RF registers, RF capacity is wasted. Conversely, the added shifter in the second design involves additional access delays, but enables more efficient use of limited RF capacity when parameters are small.

Note that annotations facilitate transforming and/or re-ordering message fields that are transferred to the RF. For instance, because each message byte can be individually addressed, a set of annotations for a message can be used to transform a big-endian format to a little-endian format (e.g., by reversing the order of the addresses in the annotations such that the bytes for a four-byte value are flipped when the message bytes are stored in the register file).

4. Performing Application Logic Operations

In some embodiments, after all of the parameters that are needed for an operation have been loaded into the RF, the FD can signal to the AL that an appropriate handler can be initiated. For instance, the FD may be configured to assert a start signal (i.e., an action trigger) and output a "handler number" (e.g., a value that indicates the operation that should be performed for the message fields). The AL uses this handler number to obtain a sequence of handler instructions from a memory unit and, upon receiving the start flag, begins executing these instructions. Note that the FD may activate the start signal as soon as the last parameter needed by the AL is loaded (e.g., at the "logical end of the message"); this may occur well before the end of the message has actually been received, if the remainder of the message does not contain any fields that are needed as parameters. In some embodiments, the FD is instructed to activate the start signal via the annotations. For example, each annotation associated with a message byte may include one or more bits that specify whether the start signal flag is to be activated and/or the set of handler instructions should be initiated. Note that the instructions for the AL are matched to their associated message type, and thus for a valid message will execute a set of logical operations that handle the stored message bytes appropriately.

Figure 12:
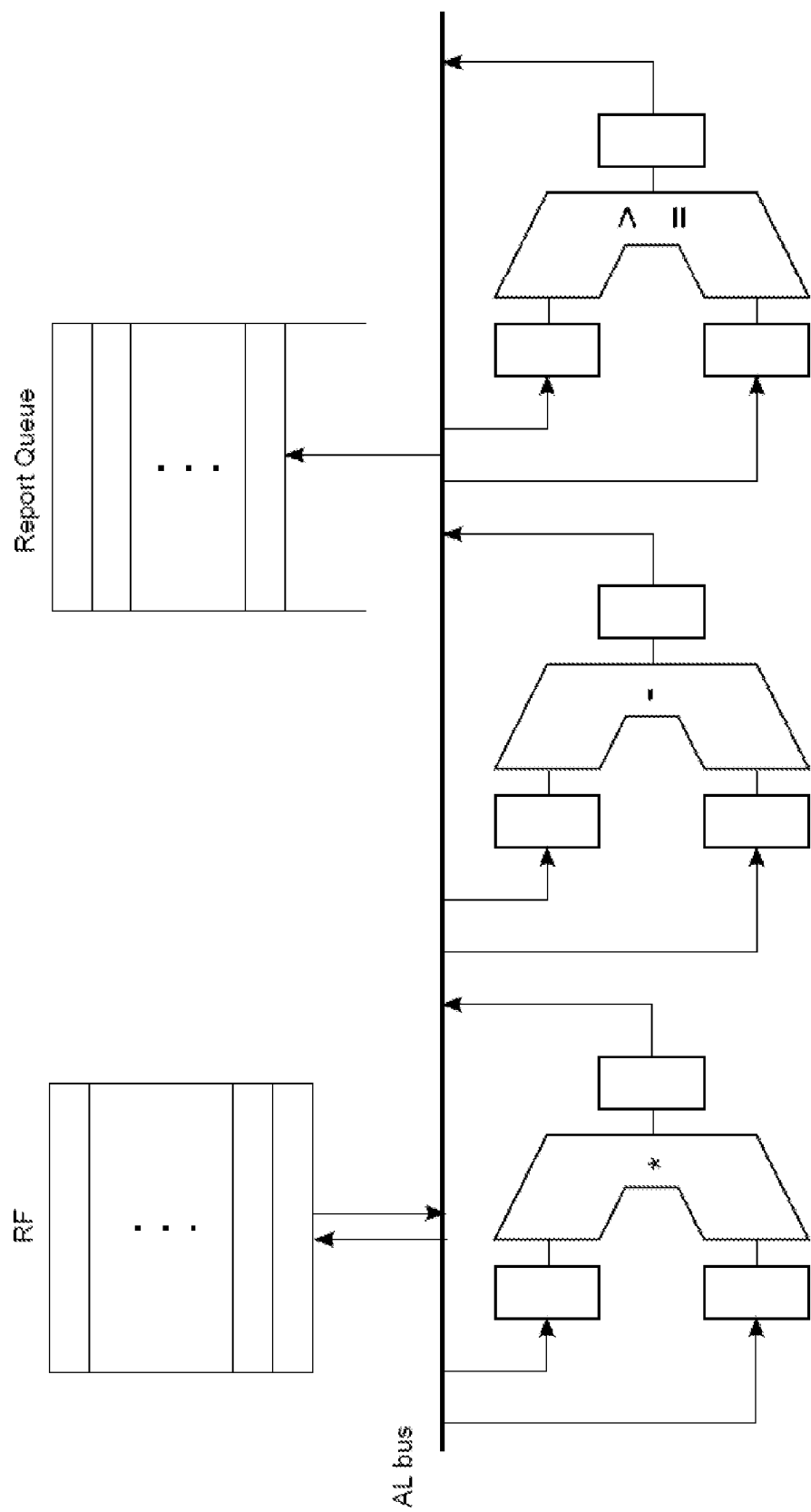
FIG. 12 illustrates an exemplary application logic architecture that includes a single-instruction processor architecture in accordance with an embodiment.

FIG. 12 illustrates an exemplary AL architecture in which a 64-bit bus connects an RF with a subtractor, a multiplier, a comparator, and a report queue. The RF is used to supply the initial values for the message handler, and is also used by the handler to store intermediate results. Results generated by the message handler can be exported to a report queue after the assigned set of handler instructions have completed. The exemplary AL architecture of FIG. 12 is a single-instruction processor architecture in which the only known instruction is a "move." Operations such as subtraction, multiplication, or comparison are implicit, and are triggered when both input operands have been loaded.

Table 1 illustrates an exemplary message handler in which two register values (R1 and R2) have been extracted from a message and loaded into the RF (of FIG. 12) using annotations, and are then used as inputs for a multiplication operation. The resulting product is compared with a constant (e.g., to confirm that the value of the product is within a valid range), and the result of the comparison is then reported to a report queue. Note that the sources and destinations of the move operations specify which functional unit and register to use, and thus implicitly specify the operations to be performed. In some implementations functional units may involve some programmability (e.g., a comparator that receives two inputs may be able to determine whether a first value is greater than, less than, or equal to the second input); in such implementations, a functional unit may be configured to perform all of the operations in parallel and then multiplex out the result for the desired operation based on the specific instruction being performed.

TABLE 1

| |
| --- |
| R1 -> Multiplier.A |
| R2 -> Multiplier.B |
| Multiplier.R -> R3 |
| R3 -> Comparator.A |
| 1,000,000 -> Comparator.B |
| Comparator.R -> Report Queue |

Note that while the data path illustrated in FIG. 1 shows a single AL, in some embodiments the described techniques can be parallelized across multiple FDs, RFs, and ALs. A single-AL design may be sufficient if the AL can finish processing a message before it needs to start processing the next message. More specifically, the elapsed time between when the start flag is asserted for a first message and the first parameter of the next message is loaded into the RF would need to be sufficiently long to execute the message handler for the first message. Such constraints may be achievable (e.g., depending on the speed and capabilities of the FD and RF, the set of expected message types, and the speed and characteristics of the associated AL logic and message handlers). If, however, these constraints cannot be guaranteed, an implementation may need multiple ALs.

Figure 13:
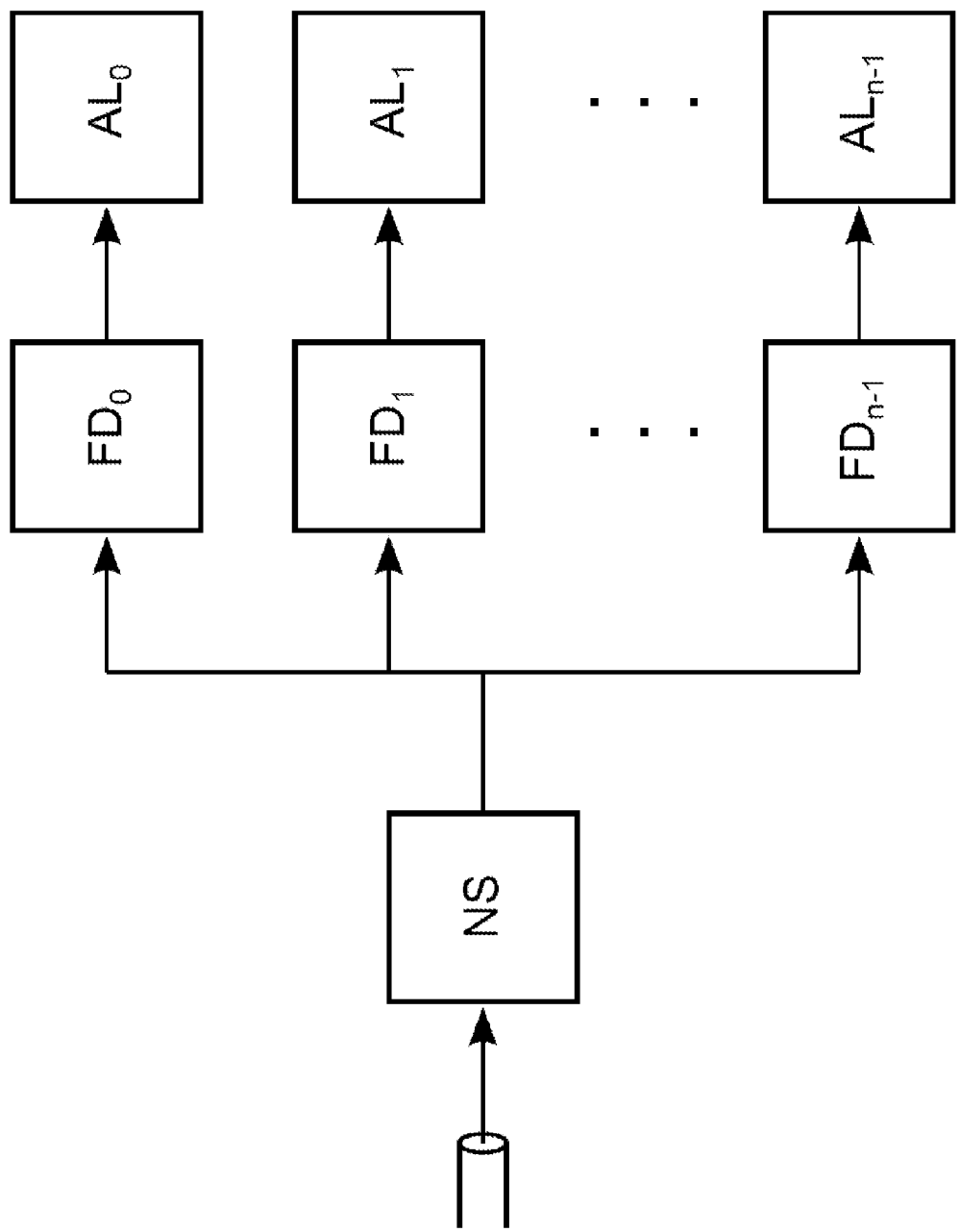
FIG. 13 illustrates an exemplary architecture in which a network stack forwards incoming messages to multiple paired instances of format decoders and application logic in accordance with an embodiment.
Figure 14:
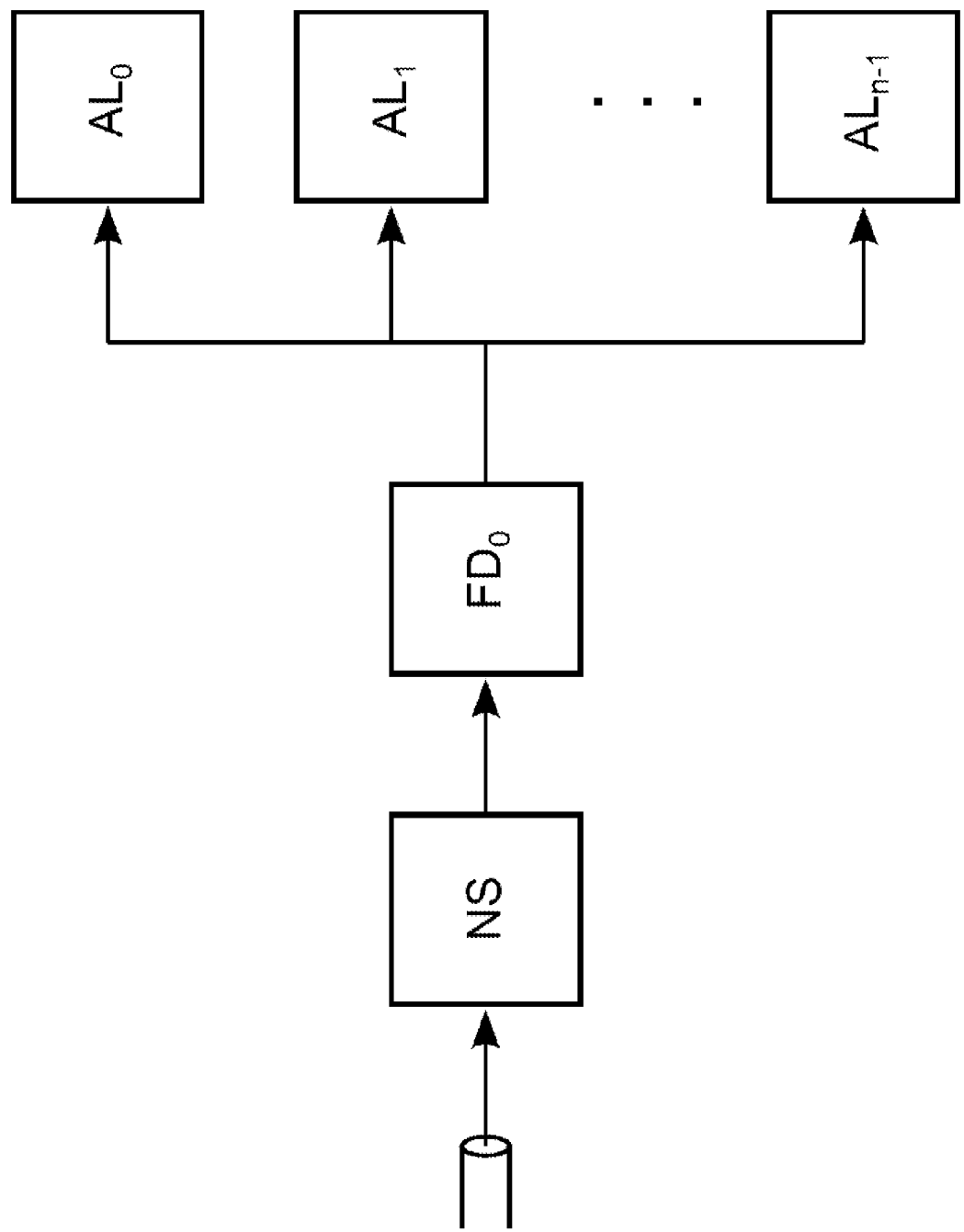
FIG. 14 illustrates an exemplary architecture in which parameters processed by a single format decoder are forwarded to multiple instances of application logic in accordance with an embodiment.

FIGS. 13-14 illustrate architectures that include multiple ALs. In FIG. 13, messages are forwarded from the NS to multiple FDs in a round-robin fashion, and each FD is connected to a distinct AL. The number of FD-AL pairs needed to keep up with the flow of incoming messages depends on factors such as the incoming network bandwidth, message size, message type, and message handling operations. For instance, if messages are typically five 64-bit words long (e.g., can be loaded into the RF in five cycles) and take 15 cycles to process, (15+5)/5=4 pairs of FDs and ALs would be needed to process a continuous stream of messages. FIG. 14 illustrates an alternative design in which parameters processed by a single FD are processed by multiple ALs; this design uses fewer resources, but requires the single FD to operate quickly enough to be able to process messages at the rate at which they are received and store the parameters in one or more RFs that are then accessed by the multiple ALs.

Using annotations decouples the initialization of message handler parameters from the actual execution of the message handler, and thus substantially simplifies the implementation of message handlers. For instance, message handlers executing in the application logic no longer need to parse message fields, thereby allowing operations performed by the message handler to be scheduled using static scheduling techniques (which involve loading parameters into the RF at fixed times from fixed positions in the data path). In other message-processing architectures, guaranteeing fixed timing and positions for parameters requires messages to be aligned with the data path; this means that if message lengths are not multiples of the data path width, delay gaps may need to be inserted between messages to ensure that alignment with the data path can be achieved. These delay gaps may require buffer memories for delayed message fields and may involve situations in which subsequent messages slowly back up (especially if a set of messages arrive back-to-back). Hence, if the positions and the availability of the parameters vary and cannot be timed appropriately, static scheduling will not work. In contrast, the disclosed techniques allow for arbitrary alignment of incoming messages and ensure that needed message fields are already stored and available in the register file at the point that the message handler is invoked, thereby allowing a compiler to use static scheduling techniques to schedule operations that use these message fields as parameters. More specifically:

Messages can be arbitrarily aligned with respect to the eight-byte wide data path of the FD. Hence, message fields can be located at arbitrary positions within the current set of eight-byte message words processed by the FD; as long as the message is byte-aligned, no complications arise if a multi-byte message field is not always contained in one message word or in a single clock cycle, but is instead split across multiple message words. More specifically, the time at which message fields are transferred into a register file may vary based on the portions of the message that are received by the FD in a given window; the accompanying annotations ensure that each received byte is handled properly.

The distance between message fields loaded into the RF can vary (e.g., if the message format allows for optional fields or if the NS or FD stall for some reason), but the message handler is only invoked at a time that all (or a minimum initial set, as described below) of the parameters are available (as signaled by the annotation).

Thus, the disclosed techniques facilitate dynamically scheduling the loading of parameters in a manner that can manage changes in alignment and timing. Releasing the handler from the burden of including instructions for loading parameters further simplifies the execution of the handler; the data dependencies for the message fields are known at the time the handler is compiled, thereby allowing a compiler to statically schedule handler instructions such that the AL does not need additional control logic (e.g., branch instructions) to determine when instructions can be issued.

Note also that the disclosed techniques provide many of the speed benefits of hard-wired hardware solutions while still providing flexibility and programmability (e.g., via configurable annotations and message handlers). Typical hard solutions often involve ASICs or FPGAs. Once fabricated, ASICs cannot be modified. Alternatively, using an FPGA involves defining a set of decoders as library functions and then synthesizing the design into the FPGA. In this scenario, supporting a new protocol would involve adding a new library that includes the message formats for the new protocol and then re-synthesizing the FPGA. In contrast, the disclosed techniques can support reconfiguring the system to support additional fixed-offset protocols without changing the underlying hardware (e.g., without needing to fabricate a new ASIC or adding and then synthesizing a new decoder library for an FPGA); configuring the system to support a new message type only involves creating a new annotation and a new message handler and then writing the specification for these two items to the appropriate memory (or memories). Hence, the disclosed techniques can provide higher performance than general-purpose software techniques while still offering improved programmability over pure-hardware techniques.

5. Exemplary Applications for Annotations

As mentioned previously, different message protocols may have different message types and formats, with the message type for each message being identified by a specific set of bit and/or byte values in the message itself. In some embodiments, message handlers may be configured to filter through messages to look for certain values and perform subsequent actions based on such values. For instance, the disclosed techniques may be used to perform event processing, with message handlers filtering through messages and analyzing message fields to look for a specified set of events. Message handlers may also be configured to identify and forward a specified set of messages. For example, in some scenarios dedicated AL units and message handlers may be configured to handle a select set of "fast-path" messages, while messages that involve more complex computation or are associated with exceptions may be forwarded to a general-purpose processor (or, in some scenarios, to another network and/or another computing device that has been designated to handle a specified class or type of message). The disclosed techniques may also facilitate filtering out or transforming (e.g., compressing) a set of message fields that are forwarded elsewhere.

Note that annotations and message handlers are defined in the context of a specified message type's structure and characteristics, and thus can be ordered and optimized to execute efficiently; the annotation can be configured to include a signal that initiates the message handler as soon as enough data is available to begin operation. For example, if a given message type is known to contain three word data fields, and the message handler and AL are known to need one cycle to move an operand from the RF to a functional unit, the annotation for the second word data field may include a flag that already initiates the message handler, which can begin operating upon the first two word fields (whose contents have already been stored into the RF) while the third word field is still being stored into the RF. In some embodiments, annotations may include multiple signals that can invoke different message handlers (and different operations) at different points in a message of a given message type.

Note that while the preceding examples illustrated a format decoder that handles eight bytes of message data per cycle and a register file that holds 128 bytes, format decoders and register files that perform the disclosed techniques are in no way limited to these sizes, and annotations are not limited to one annotation byte per message byte. For instance, the annotations for each given byte can be larger than a byte, and may include additional bits and/or fields that are not used for addressing (e.g., the specified start signal, or other additional signals). For instance, 16 annotation bits per message byte might be used when writing message bytes into a 64 Kbyte register file, or additional annotation bits per message byte might be used when routing messages to another computing device using a network address.

In some embodiments, annotations are used to specify a routing destination for message bytes either instead of or in addition to a register file address. For instance, a message handler for a given message may be configured to access the message bytes stored in the (annotation-specified) register file location and forward them to an interface for the routing destination (e.g., another functional unit or computing device). In general, annotation information may be consumed both by the register file (e.g., as target addresses) and/or by other functional units in the system.

In some embodiments, annotations are defined on a per-message-type basis; hence, annotations emitted for two messages of the same type will always specify the same specified register file (and/or memory) address. In such embodiments, the AL needs to process each message before the subsequent message overwrites the RF contents (at the same addresses), or multiple register files may be used in a round-robin manner (as described previously) to ensure that data is not overwritten before it is used. In alternative embodiments, one or more bits of an annotation may be changed on a per-message basis. For instance, the annotation for one or more message types may include a network address that may periodically change or the contents of a free-running counter in memory that is incremented every cycle. In some embodiments, the FD may also be configured to replace one or more message fields with information included in an annotation. For example, the FD may receive a given message type that includes several text fields (that are typically known to be empty) and then fill these fields (e.g., with a timestamp from the above-mentioned memory counter or another value stored in the annotation memory). This could be achieved using a range of techniques (e.g., by writing such values into the appropriate fields of the RF before forwarding the message on to another entity, or even by substituting in the new bytes (from an annotation) as the message bytes are being processed in the FD). In some scenarios, such substitutions may be triggered by another signal bit in the annotation values that signals whether a given message byte should be substituted or not on a per-message-byte (and as-needed) basis. Such capabilities could, for instance, be used by a routing application to swap message labels on-the-fly.

Figure 15:
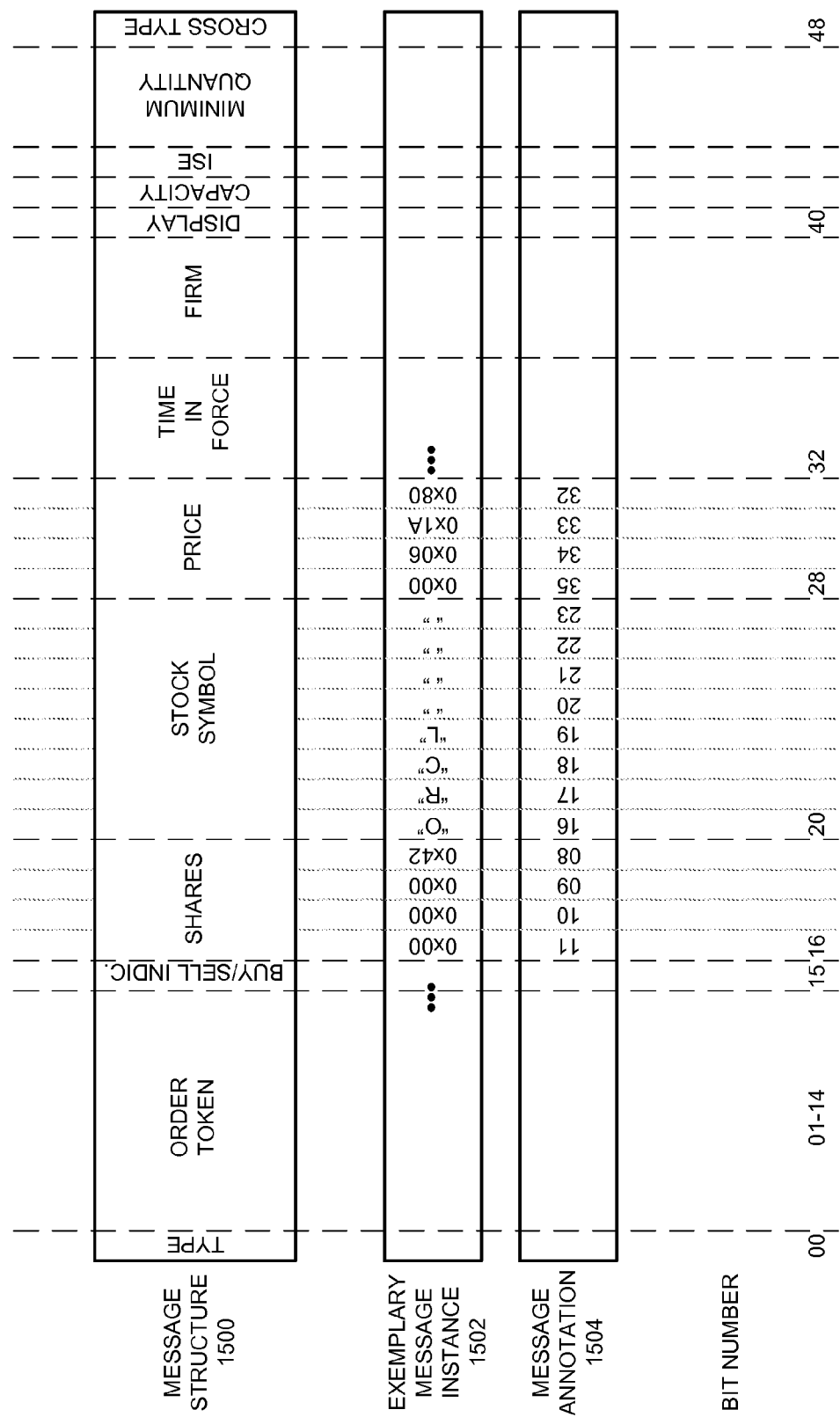
FIG. 15 illustrates an exemplary message format for an exemplary digital communications protocol that facilitates high-performance processing of financial transactions in accordance with an embodiment.

FIG. 15 illustrates a message format for an exemplary digital communications protocol (the "OUCH protocol," which is used by the NASDAQ stock exchange) that facilitates high-performance processing of financial transactions. A financial service system receiving messages specified in this protocol may serve as a gateway between trading entities and stock exchanges, inspecting all of the transaction messages between traders and the stock exchange to perform a set of initial checks. In such an environment, the disclosed techniques facilitate checking such messages with minimal additional latency and without a dedicated application layer or application processing.

In the context of FIG. 15, the message structure 1500 is used for entering orders; upon detecting a message of this type, a format encoder emits an exemplary message annotation 1504 for this message type that stores several numeric fields (e.g., the specified number of shares and the price for the order) and a text field (e.g., the stock symbol) in a register file, and then invokes a message handler that determines: (1) whether the quantity of shares being ordered exceeds some threshold; (2) whether the specified stock price is within an expected range; (3) the current exposure of the client performing the order (e.g., to ensure that the client has funds to cover the transaction); etc. More specifically, for a given exemplary message instance 1502, message annotation 1504 may specify that (as illustrated in FIG. 16): (1) the shares value be loaded into register file bytes 8-11 (register $R_{O1}$); (2) the text string specifying the stock symbol be loaded into register file bytes 16-23 (register $R_{O2}$); and (3) the price value be loaded into register file bytes 32-35 (register $R_{O4}$). In this example, the annotations for the shares and price fields loaded these values into the register file in the same order specified by the protocol, while the annotations for the stock symbol instructed the bytes of that field to be loaded into the register file in reverse order.

Note that different financial exchanges may use different protocols, many of which are also optimized for high processing performance and thus use fixed offsets. The disclosed techniques facilitate creating systems that can "speak" all of these protocols. Such systems can be easily reconfigured to operate in different exchanges or to support new protocols, and can easily detect, check, and forward messages for protocols that are managed by other systems without having to undergo a hardware reconfiguration, thereby providing a flexible, high-performance solution.

Figure 17:
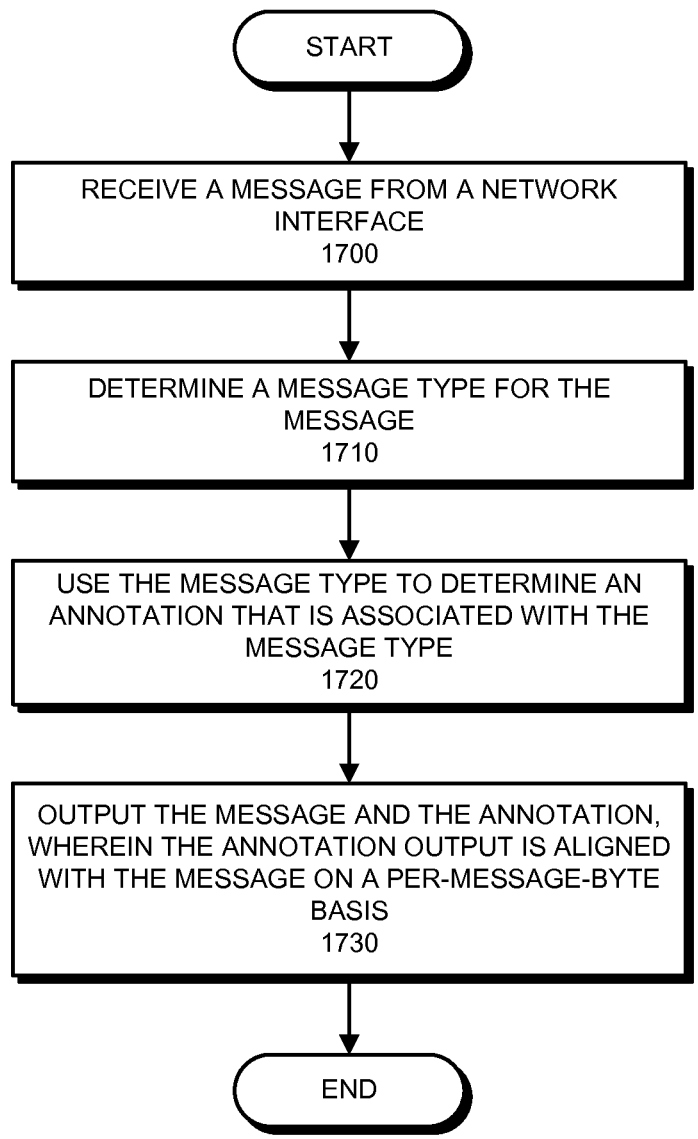
FIG. 17 presents a flow chart that illustrates the process of using annotation to extract parameters from messages in accordance with an embodiment.

FIG. 17 presents a flow chart that illustrates the process of using annotations to extract parameters from messages. During operation, a computing device receives a message from a network interface (operation 1700). After determining a message type for the message (operation 1710), a format decoder in the computing device uses the message type to determine an annotation that is associated with the message type (operation 1720). The message and the annotation are then output to one or more functional units of the computing device, with the annotation output aligned with the message on a per-message-byte basis (operation 1730).

6. Variations in Application Logic

Figure 18:
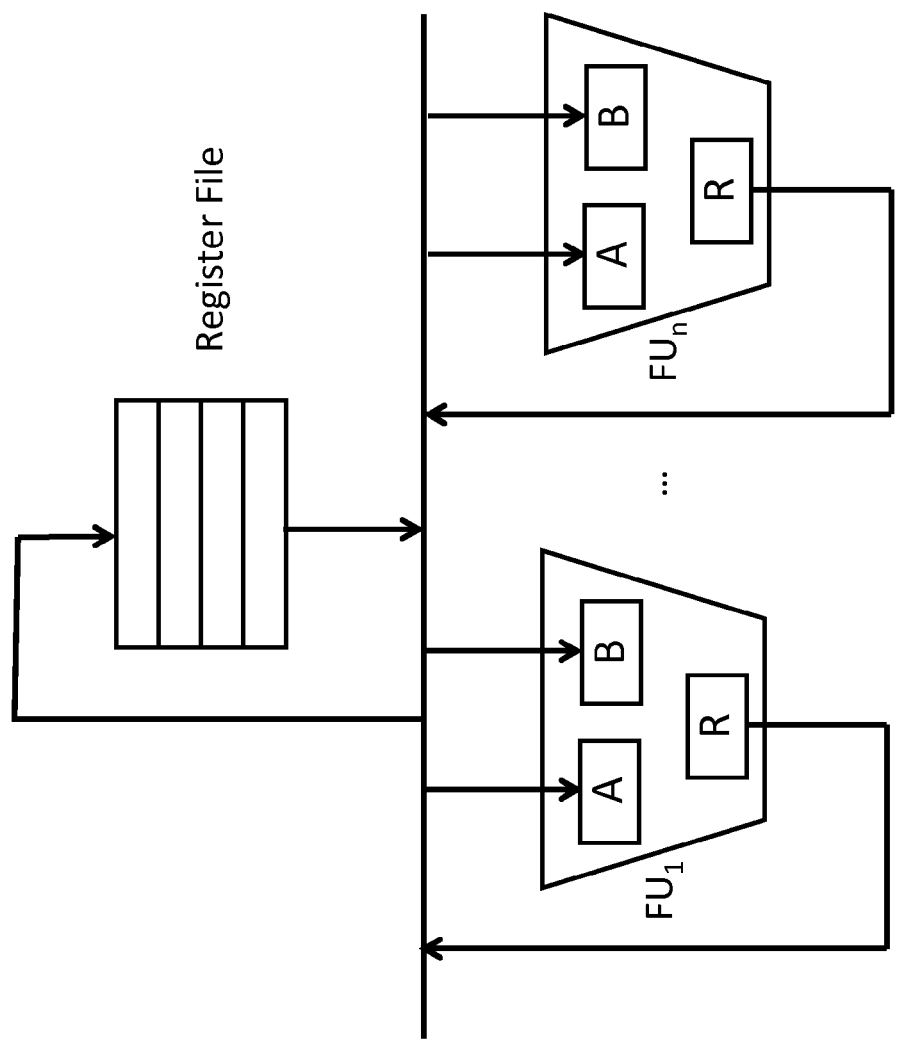
FIG. 18 illustrates a generalized view of the data path of a single-move single-instruction processor in accordance with an embodiment.

FIG. 18 illustrates a generalized view of the data path of a single-move single-instruction processor. As in FIG. 12, the interconnect for this architecture consists of a single bus that is used both for data transfers from the RF to the functional units (FUs) as well as from the FUs to the RF. In some embodiments, a multi-move single-instruction processor architecture (e.g., a processor that uses multiple busses to execute multiple moves simultaneously) can provide a number of advantages over a single-move single-instruction processor.

Figure 19:
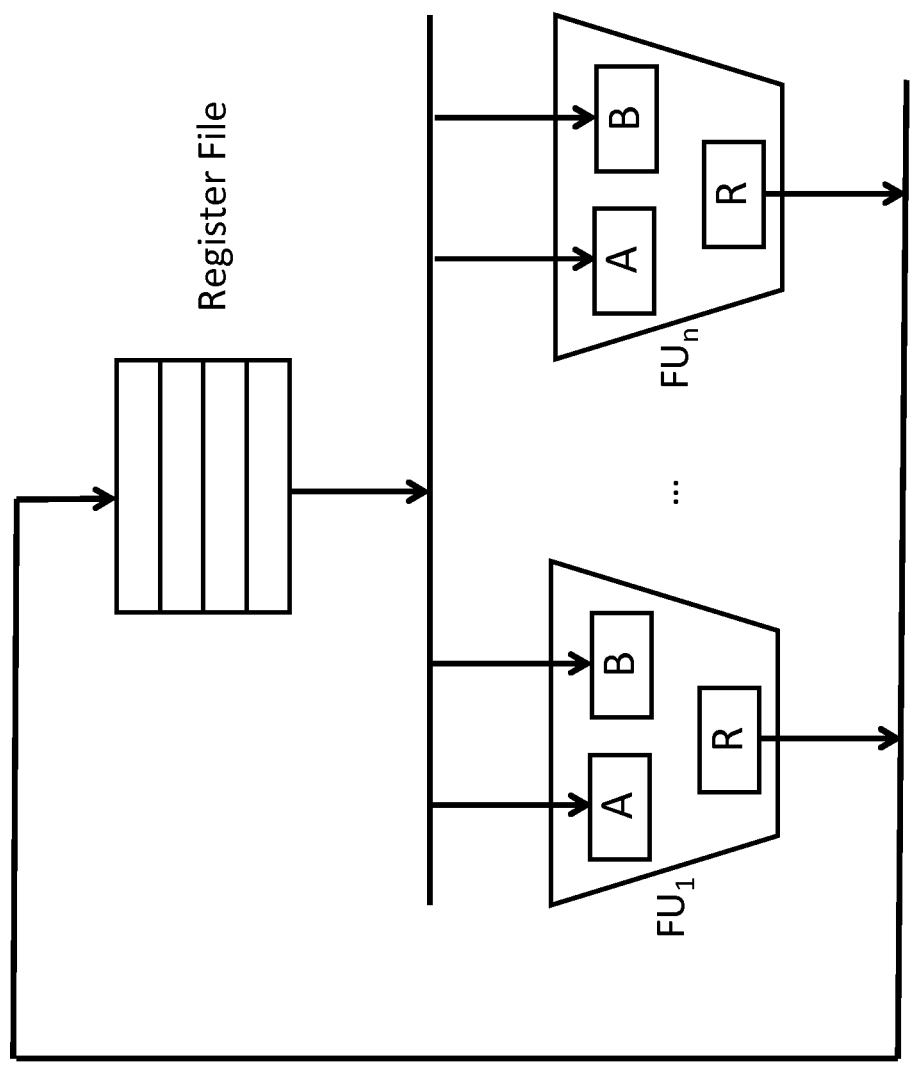
FIG. 19 illustrates a block diagram of the data path of a dual-move single-instruction processor in accordance with an embodiment.

FIG. 19 illustrates a block diagram of the data path of a multi-move one-instruction processor with two busses (e.g., a dual-move single-instruction processor). As for the processor of FIG. 18, the processor of FIG. 19 includes an RF and functional units $FU_1$-$FU_N$. However, in FIG. 19 the processor's interconnect is separated into a first bus that moves data from the RF to the inputs of the FUs and a second bus that moves data that is output by the FUs to the RF. Data can be transferred over these two busses simultaneously; e.g., unlike the architecture of FIG. 18, while one transfer takes place between the RF and an FU, another transfer can simultaneously take place between an FU and the RF as well. Using two busses (as illustrated in FIG. 19) instead of a single shared bus (as illustrated in FIG. 18) potentially doubles the number of move operations that can be executed in a given time interval, and allows a first value to be moved into an RF while a second value is being simultaneously moved out of the RF. Furthermore, separating data movements to and from the RF across two separate busses reduces the fan-ins and fan-outs for each bus, thereby allowing simpler routing and lower propagation delays for the multi-move architecture.

A dual-move single-instruction processor's instruction format may be structured as "$src_1$ $dst_1$ $src_2$ $dst_2$," where and $dst_1$ specify the source and destination for the first move (i.e., from the RF to the FUs) and $src_2$ $dst_2$ specify the source and destination for the second move (i.e., from an FU to the RF). For the first move, $src_1$ specifies which register in the RF is read and $dst_1$ specifies which FU input operand register will receive the read value. For the second move, $src_2$ specifies which FU output operand register is read and $dst_2$ specifies which register in the RF receives the outputted value.

Figure 20:
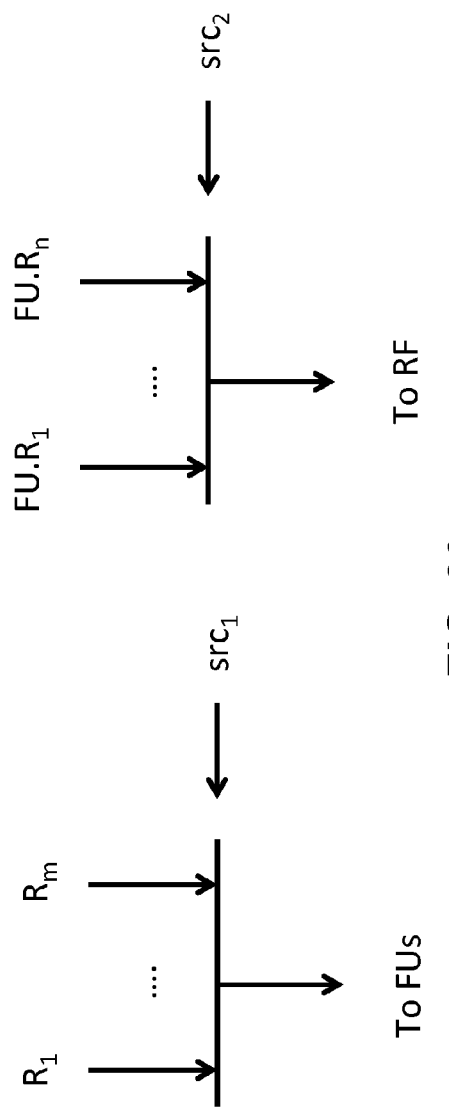
FIG. 20 illustrates multiplexers that forward operands to and from functional units in accordance with an embodiment.

In some embodiments, the processor includes an instruction decoder that generates corresponding read enable signals for the src fields and write enable signals for the dst fields of each instruction being processed. Reads from the FUs may involve a multiplexer that forwards the output operand from the selected FU (as illustrated in the right portion of FIG. 20), while reads from the RF may involve a multiplexer that selects a register (from among registers 1-$m$) whose data will be transferred to the input operand register of the specified FU (as illustrated in the left portion of FIG. 20).

Execution of an FU's operation begins when all of its input operands have been loaded. For instance, consider the FUs illustrated in FIGS. 18-19, which both have two input operand registers, A and B, and might correspond to a multiplier or adder. Each FU may maintain internal state to determine which input operand registers have been loaded, and once both operands A and B for a given FU have been loaded, that FU can begin operating using the loaded operands. The FUs can be fully pipelined (with the pipeline length depending on the complexity of the FU's operation), and write a result into output operand register R after a fixed number of cycles. An FU that has begun processing a set of operands is no longer considered 'loaded'; i.e., both A and B will need to be written again before the next operation commences. Alternatively, some FU designs may always (i.e., in every clock cycle) start processing their most-recently-received set of operands, thereby allowing operands that don't change to not have to be reloaded.

Figure 21:
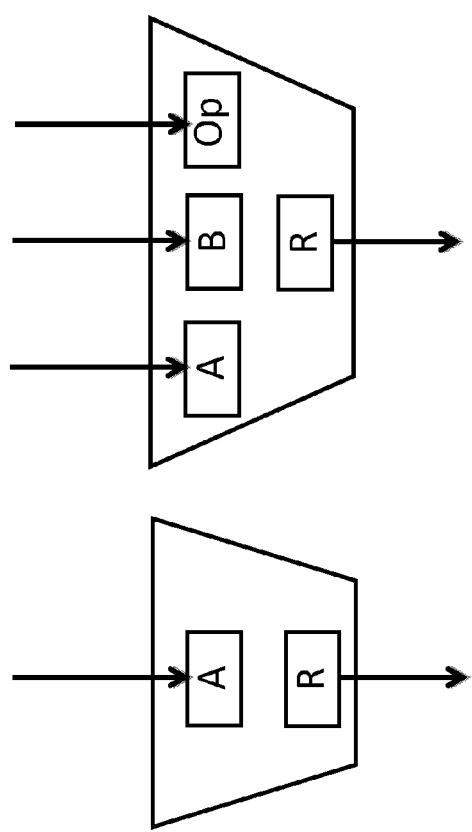
FIG. 21 illustrates exemplary FUs with one and three input operand registers in accordance with an embodiment.

Note that while the FUs illustrated in FIG. 18-19 have two input operands, FUs may have different numbers of input operand registers. FIG. 21 illustrates two additional exemplary FUs with one and three input operand registers, respectfully. Examples of operations that only require one input operand (register A) include a one's complement generator and a lookup table, while an exemplary FU that uses three input operand registers (e.g., A, B, and Op) is a logic unit that performs a Boolean operation specified by Op on operands A and B.

Tables 2-4 illustrate several exemplary instruction sequences that can be executed in the dual-move architecture of FIG. 19. Table 2 illustrates a multiplication operation in which a value in register 0 is written into a multiplier's input operand register A by the first instruction and a value in register 1 is written into the multiplier's input operand register B. When both operands have been written, the multiplication operation executes. After two delay slots, the result of the operation is written into register 2. Note that (as illustrated in Table 2) instructions which do not perform a move operation are indicated by a "no operation" (or NOP) instruction.

TABLE 2

| | |
|---|---|
| R0 MUL.A | NOP |
| R1 MUL.B | NOP |
| NOP | NOP |
| NOP | NOP |
| NOP | MUL.R R2 |

Table 3 illustrates an instruction sequence in which FU operations and corresponding moves are statically scheduled to overlap (e.g., a multiplication operation is followed by an addition operation and a subtraction operation). In this example, one delay slot is assumed for the addition and subtraction operations (and two delay slots are assumed for multiplication operations, as previously). A compiler that is aware of the FU's pipeline lengths can generate optimized executable code (at compile time) that determines in which clock cycle a move should be executed and, in particular, in which clock cycle the results of an operation can be read. For the instructions illustrated in Table 3, a compiler has improved program performance by generating a set of interleaved operation; for example, registers 3 and 4 are loaded into the adder's input operand registers while the multiplication operation is in progress. This set of instructions also illustrates the execution of parallel moves; the subtractor's input operands are loaded while the results from the multiplier and adder are read out in parallel.

TABLE 3

| | |
|---|---|
| R0 MUL.A | NOP |
| R1 MUL.B | NOP |
| R3 ADD.A | NOP |
| R4 ADD.B | NOP |
| R6 SUB.A | MUL.R R2 |
| R7 SUB.B | ADD.R R5 |
| NOP | NOP |
| NOP | SUB.R R8 |

Part of a compiler's responsibility is to resolve data dependencies. Consider the set of instructions illustrated in Table 4, which reflect a change to the previous example (of Table 3) in that the addition operation depends on the output of the multiplier. As a result, in the program of Table 4 the (independent) subtraction operation is moved before the addition operation, and the adder's input register B is loaded after the multiplication result has become available.

TABLE 4

| | |
|---|---|
| R0 MUL.A | NOP |
| R1 MUL.B | NOP |
| R6 SUB.A | NOP |
| R7 SUB.B | NOP |
| R3 ADD.A | MUL.R R2 |
| R2 ADD.B | SUB.R R8 |
| NOP | NOP |
| NOP | ADD.R R5 |

In some embodiments, the execution time for an instruction (e.g., consisting of two moves) in a dual-move architecture takes one clock cycle. Thus, the execution time for a program corresponds to the number of instructions times the clock period.

Figure 22:
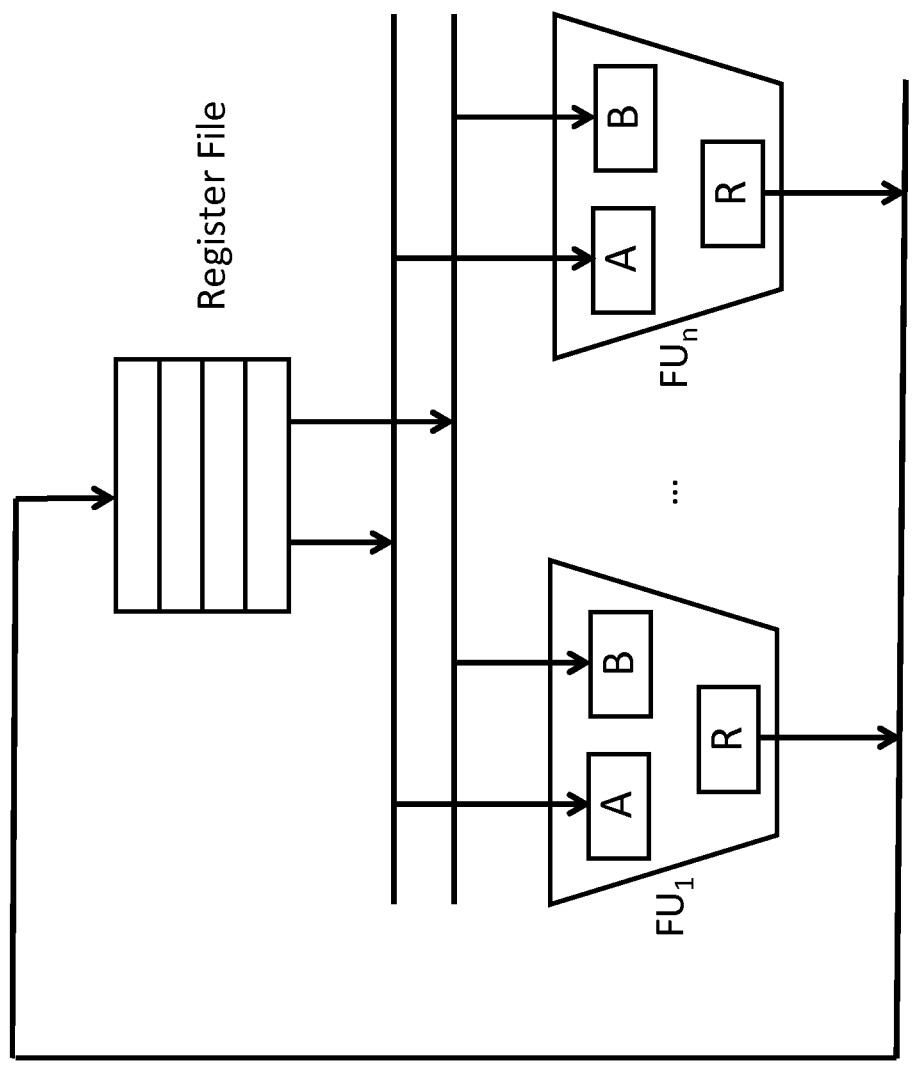
FIG. 22 illustrates a block diagram of the data path of a three-bus processor architecture in accordance with an embodiment.

In some embodiments, the dual-bus architecture illustrated in FIG. 19 is extended to three busses. Increasing the number of busses facilitates increasing the number of input and/or output operands that can be handled in a clock cycle, and hence reduces the number of instructions needed to perform a given set of operations. FIG. 22 illustrates a three-bus processor architecture in which two separate buses are used to load FU input operand registers A and B (in contrast with a single shared bus for loading both registers). To support three busses, the RF (or, more specifically, in the context of the above-disclosed techniques, the portion of an RF that interfaces with the application logic) may need to be configured with two read ports and one write port so that each bus may simultaneously perform reads or writes (respectively). In a three-bus architecture, an instruction format such as "$src_1$ $dst_1$ $src_2$ $dst_2$ $src_3$ $dst_3$" specifies three moves.

Table 5 illustrates the instructions from Table 3 (e.g., a set of multiplication, addition, and subtraction operations without data dependencies) rewritten for the three-bus architecture of FIG. 22.

TABLE 5

| | | |
|---|---|---|
| R0 MUL.A | R1 MUL.B | NOP |
| NOP | NOP | NOP |
| R3 ADD.A | R4 ADD.B | NOP |
| R6 SUB.A | R7 SUB.B | MUL.R R2 |
| NOP | NOP | ADD.R R5 |
| NOP | NOP | SUB.R R8 |

Figure 23:
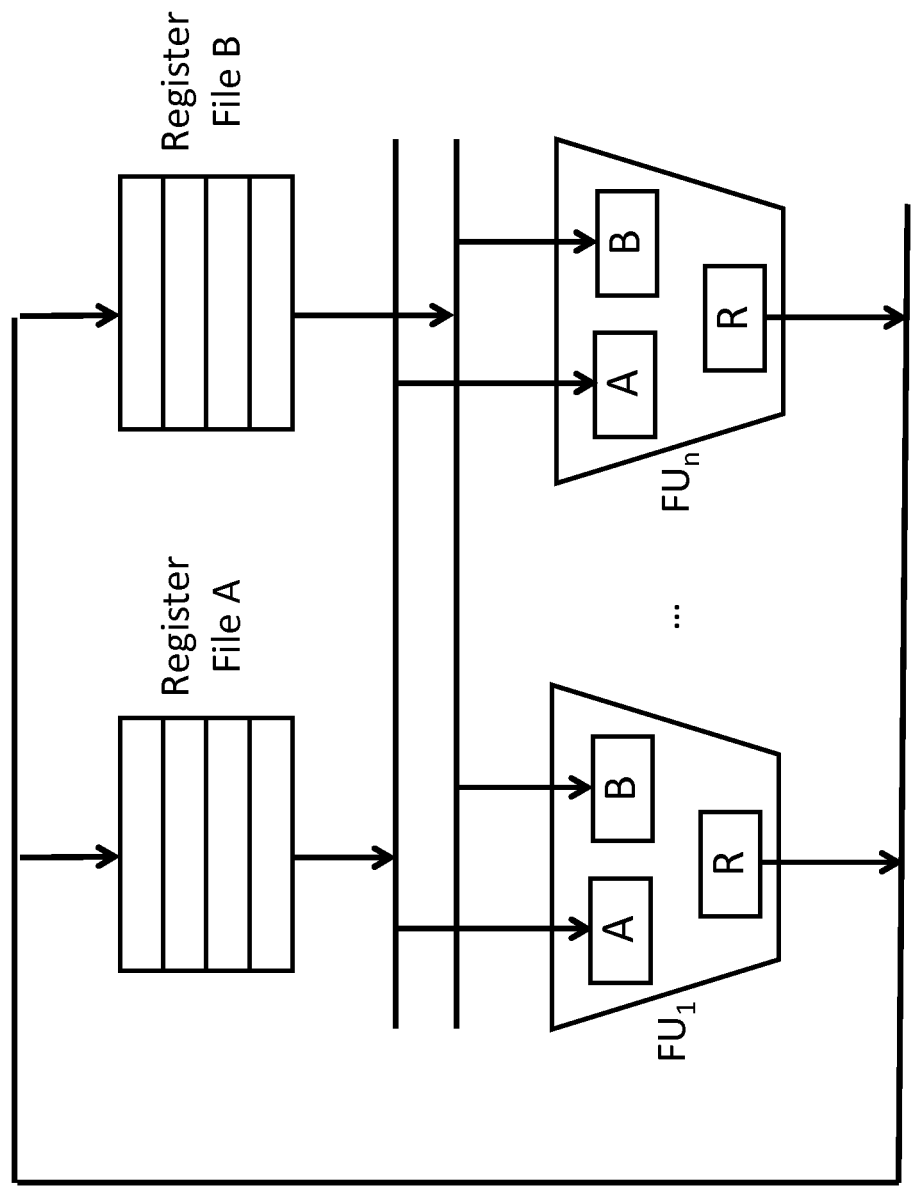
FIG. 23 illustrates a block diagram of the data path of a three-bus processor architecture that includes a split register file in accordance with an embodiment.

FIG. 23 illustrates an alternative three-bus processor architecture in which a single RF with two read ports (as illustrated in FIG. 22) is replaced with a split register file. Half of the registers for this register file are connected to a bus that connects to the FUs' A input operand registers while the other half of the registers are connected a bus that connects to the FUs' B input operand registers. A split register file design simplifies the implementation of the register file, as both halves of the register file serve different busses but only need to provide one read port. However, splitting the registers in this way may constrain the choice of register locations that can be used for loading the FUs' input registers. Some implementations may include a dedicated functional unit that copies values from one register file to another or support an option to write results to both register files (so that both register files can supply operands as needed to their respective busses).

Figure 24:
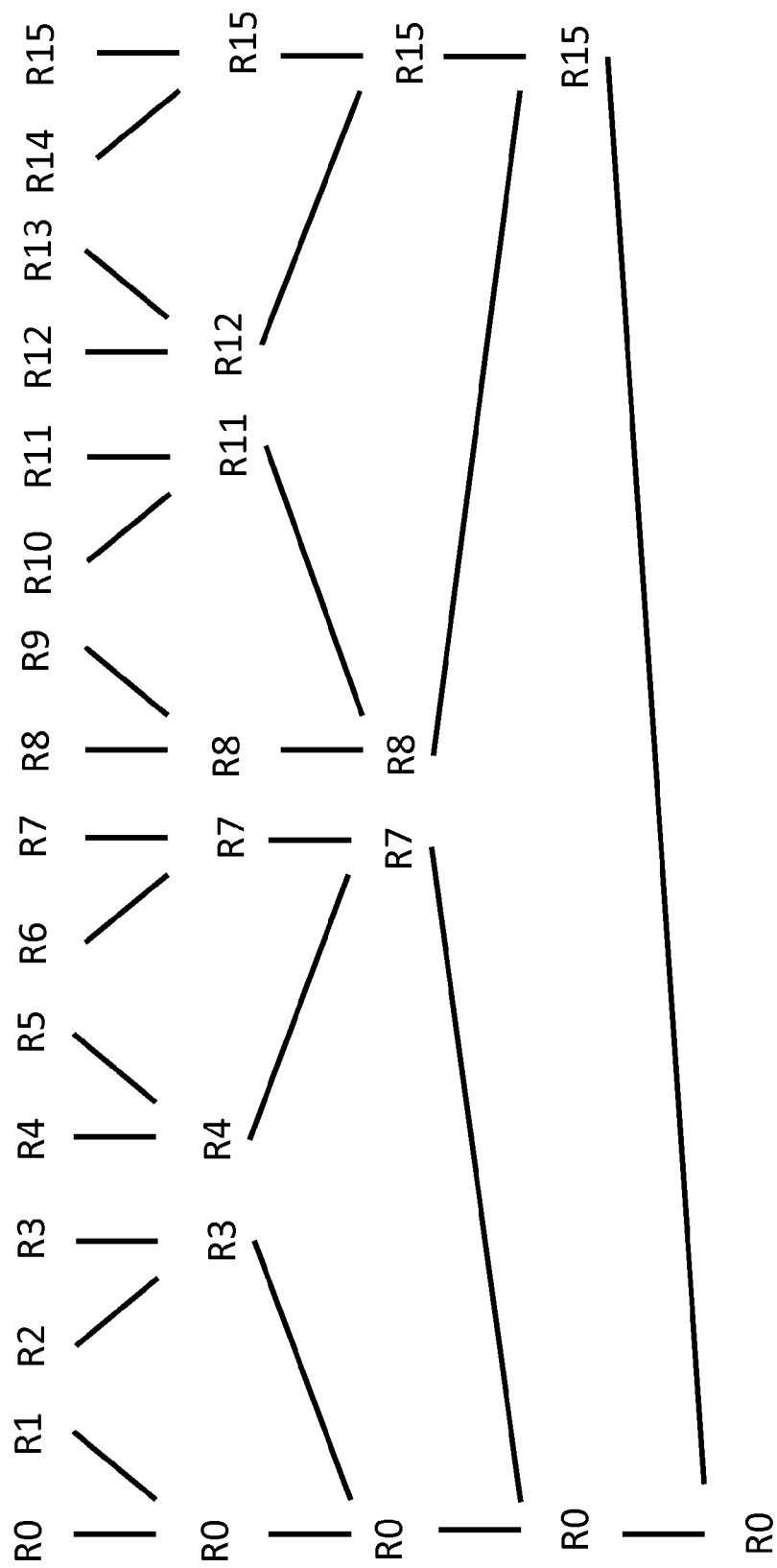
FIG. 24 illustrates the register allocations used an addition operation that fully utilizes the move instructions of a three-bus processor in accordance with an embodiment.

In some embodiments, the disclosed architectures can be extrapolated to an even larger number of busses if a larger number of parallel moves can be utilized. Ideally, the chosen interconnect architecture is balanced such that every move operation is utilized. For instance, for a processor that includes only FUs with one input operand, a dual-bus interconnect meets these criteria. Consider, for example, a set of instructions (illustrated in Table 6) that sequentially access a pipelined table that outputs table values after one delay slot; beginning with the third instruction, a table address is loaded and a table value is read every cycle. Similarly, for a processor that includes only FUs with two input operands, a tri-bus interconnect meets these criteria (of every move operation being utilized). Consider, for example, a set of instructions (illustrated in Table 7) that calculate the sum of values in registers R0 to R15, assuming an adder that outputs a result after one delay slot. To avoid dependencies, an addition tree (illustrated in FIG. 24) is used to calculate intermediate values. Note that the register allocation used by the instructions in Table 7 have been chosen such that they support the split register file shown in FIG. 23 (e.g., in this example, register file A would contain registers R0 to R7 and register file B would contain registers R8 to R15). In some scenarios, further additional busses may also be beneficial (e.g., if many functional units need to receive input operands in a given cycle and/or generate a large number of results in the given clock cycle).

TABLE 6

| | |
|---|---|
| R0 Table.A | NOP |
| R1 Table.A | NOP |
| R2 Table.A | Table.R R10 |
| R3 Table.A | Table.R R11 |
| R4 Table.A | Table.R R12 |
| ... | |

Figure 25:
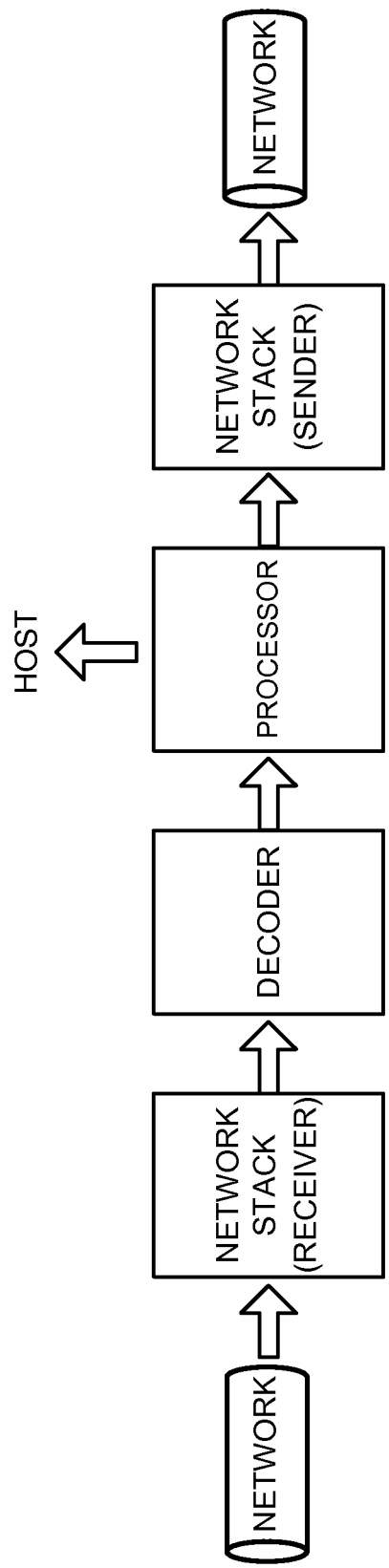
FIG. 25 illustrates the implementation of a processor in a network interface card that performs application-layer processing in accordance with an embodiment.
Figure 26:
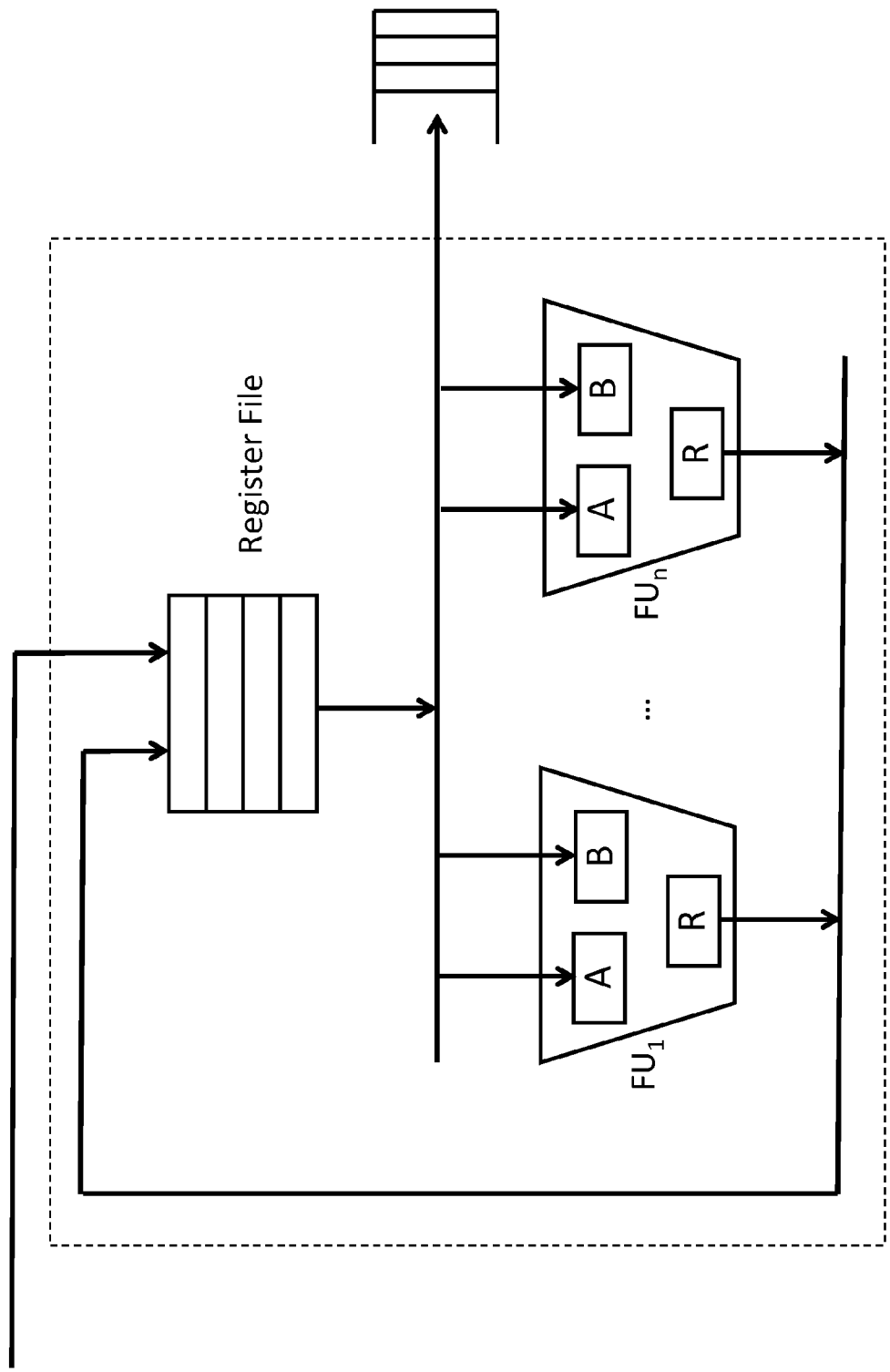
FIG. 26 illustrates a register file that receives parameters from a decoder via a separate write port in accordance with an embodiment.

Note that regardless of the number of busses, all of the above exemplary processor architectures support configurable message handlers that use move instructions to specify a set of functional units that perform operations in response to parameters that were received by an FD and written to an RF (e.g., using annotations). Consider the above-described processor implementations in the context of application-layer processing on a network interface card (as illustrated in FIG. 25). After packets are received from a network and are processed in the network stack, a decoder (e.g., a previously disclosed FD, or some other FD implementation) extracts parameters from the application data in the packet payload and writes them into the processor's RF. For instance, as illustrated in FIG. 26, the RF may have a separate write port that receives parameters from the decoder. Once all of the parameters needed to process the application message are loaded into the RF, the decoder instructs the processor to begin program execution. In implementations in which one of the above-described processors is combined with annotation-based techniques, the format decoder emits annotations that are then used to write to the RF via the separate write port, and the message handler is described in move instructions that match the processor that implements the application logic.

TABLE 7

| | | |
|---|---|---|
| R00 Add.A | R01 Add.B | NOP |
| R02 Add.A | R03 Add.B | NOP |
| R04 Add.A | R05 Add.B | Add.R R00 |
| R06 Add.A | R07 Add.B | Add.R R03 |
| R08 Add.A | R09 Add.B | Add.R R04 |
| R10 Add.A | R11 Add.B | Add.R R07 |
| R12 Add.A | R13 Add.B | Add.R R08 |
| R14 Add.A | R15 Add.B | Add.R R11 |
| R00 Add.A | R03 Add.B | Add.R R12 |
| R04 Add.A | R07 Add.B | Add.R R15 |
| R08 Add.A | R11 Add.B | Add.R R00 |
| R12 Add.A | R15 Add.B | Add.R R07 |
| NOP | NOP | Add.R R08 |
| R00 Add.A | R07 Add.B | Add.R R15 |
| R08 Add.A | R15 Add.B | NOP |
| NOP | NOP | Add.R R00 |
| NOP | NOP | Add.R R15 |
| R00 Add.A | R15 Add.B | NOP |
| NOP | NOP | NOP |
| NOP | NOP | Add.R R00 |

Figure 27:
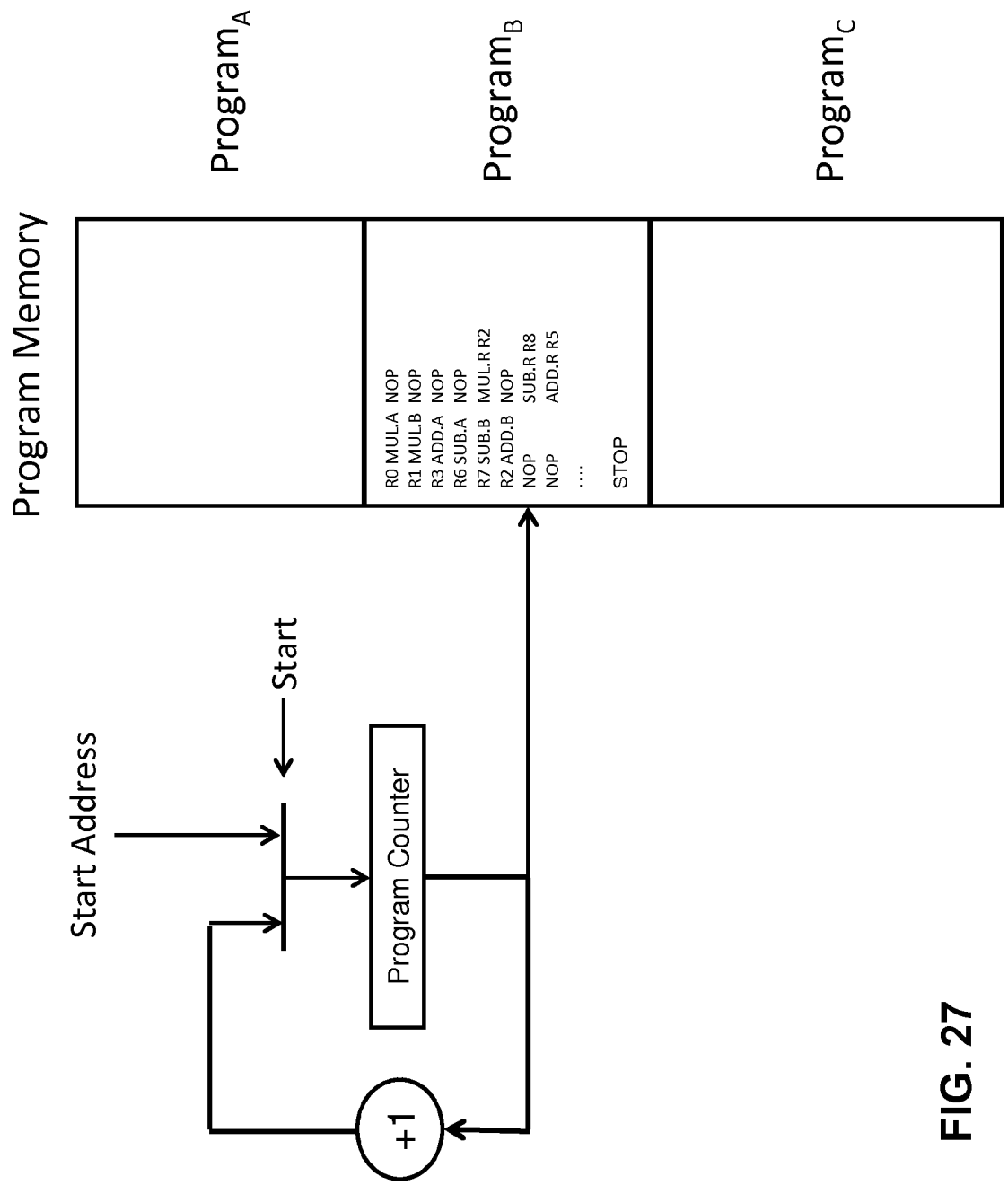
FIG. 27 illustrates the program counter logic for a multi-move processor in accordance with an embodiment.

FIG. 27 illustrates the program counter logic for a multi-move processor. Program execution is triggered by the decoder, which supplies a start address (e.g., an address for the message handler) and asserts a start signal. As illustrated, the program memory may hold several programs (e.g., multiple message handlers for different message types), with the decoder choosing a specific program by supplying the start address for the desired program. Once program execution has begun, the program counter is incremented every clock cycle, and linearly sequences through the set of instructions for the program. The end of each program can be signaled by a "stop" instruction that ends execution.

In the context of application-layer processing on a network interface card, results that are computed by a program are typically output to a register or a queue (as illustrated in FIG. 26). For instance, a given program may perform tests on application messages that are received from the network; test results that are calculated by the processor may be captured by flags that are written to an external queue.

Figure 28:
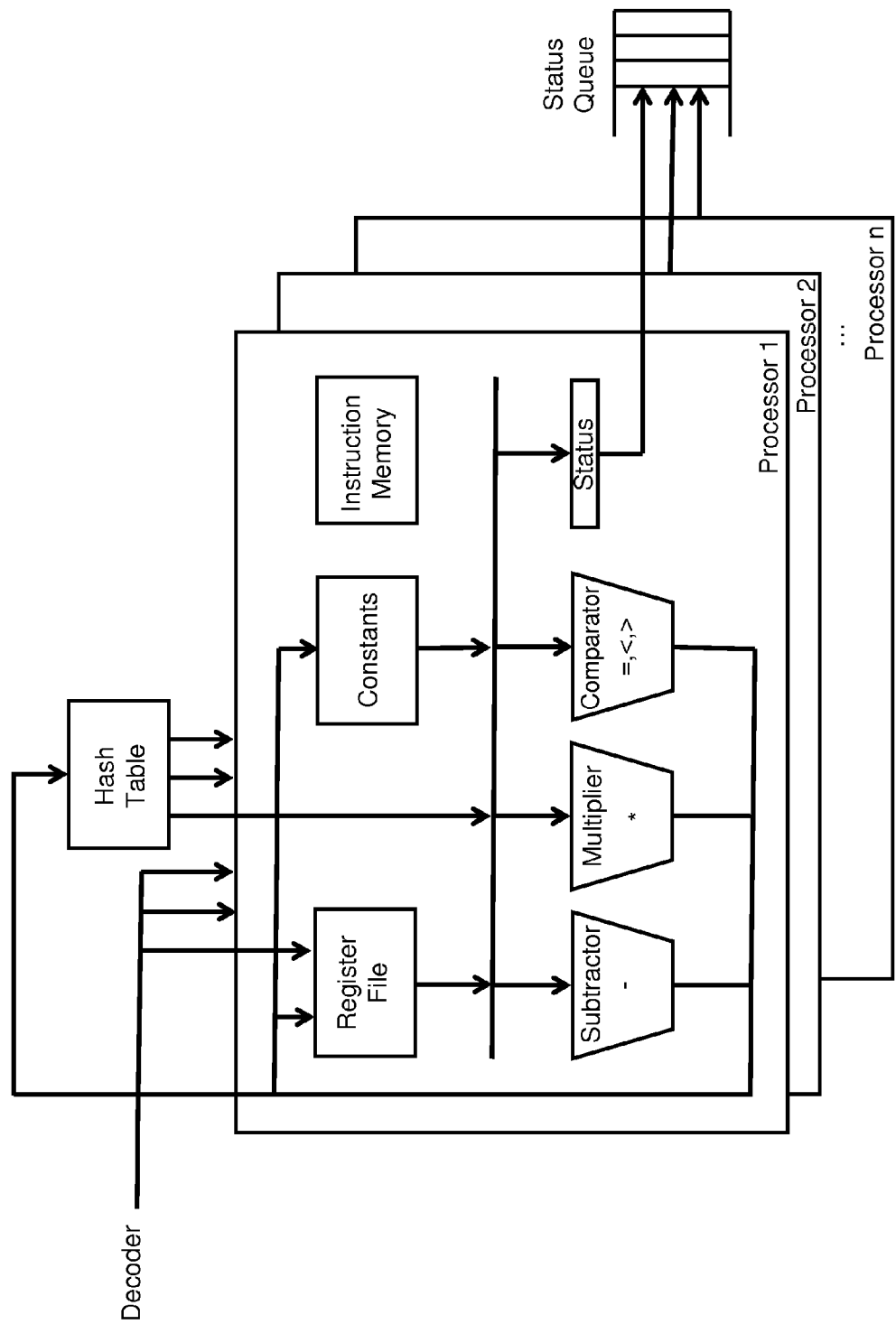
FIG. 28 illustrates an exemplary network processor architecture in which several processors operate in parallel to keep up with a stream of incoming messages in accordance with an embodiment.

FIG. 28 illustrates an exemplary network processor organization in which several processors operate in parallel to keep up with a stream of incoming messages. Enough processors are provisioned such that there is always an idle processor available when a new message arrives. As illustrated in FIG. 28, the functional units of each processor include a subtractor, a multiplier, and a comparator. In addition to the FUs, each processor also includes a constant memory and a status register. The constant memory is a read-only memory that holds constant values that are used for comparisons with message fields (e.g., to determine whether the "shares" value in FIG. 15 exceeds a threshold supplied by the constant memory), while the status register is used for accumulating flags representing test results. The system may also include an external hash table that maps keys that are derived from message fields to values. A typical hash table operation might compare a message_field$_i$ with hash_table[message_field$_j$]. In the illustrated implementation, the hash table is too large to allow a separate copy for each processor, and thus one hash table is shared across the set of processors. To avoid collisions, the accesses by the processors are time-multiplexed. Note that the constant memory and the hash table may be configured to be read-only from the viewpoint of the processors (e.g., the constant memory and the hash table may be initialized through several separate write ports, which are not shown). Note also that from the program viewpoint (e.g., in terms of encoding instruction sources and destinations), the constant memory, the status register, and the external hash table may be referenced in the same manner as FUs.

In some embodiments, a compiler may be configured to consider additional knowledge when generating the program instructions for a set of message handlers. This knowledge may include (but is not limited to) the entire set of supported message types, the set of operations to be executed for each supported message type, and/or the available set of hardware that will be used to receive and process messages. For instance, in scenarios where multiple processors are available to handle incoming messages in parallel, a compiler generating program instructions for the message handlers may need to ensure that the set of generated message handlers access shared resources (e.g., the shared hash table and/or status queue illustrated in FIG. 28) efficiently and fairly (e.g., without creating any collision or any deadlock, or injecting substantial delays). Furthermore, implementation and/or application constraints may dictate that the outputs for incoming messages are written to the status queue in the same order that the incoming messages are received. However, because program execution in the described processor architecture is deterministic (e.g., in contrast, for example, with another processor architecture that accesses a cache hierarchy; cache and memory accesses may involve additional non-deterministic delays to load data values from a lower level of the memory hierarchy), the compiler can determine exactly how long operations will take, and can take such information into account when generating the message handlers. For example, a compiler might determine the length of the longest message handler (e.g., the maximum number of instructions needed for the longest message handler in the set of supported message handlers) to be twenty processor cycles, and then: (1) pad all of the message handlers to be the same length (e.g., generating the same number of instructions for each message handler, perhaps by including no-op instructions for shorter message handlers as needed); and (2) ensure that all of the message handlers access a shared resource (such as a hash table or a status queue) at the same "known" time in a time-multiplexed manner (e.g., in this specific example, all of the message handlers might be configured to write to the status queue in their twentieth cycle, thereby ensuring that multiple processors do not attempt to write to the status queue at the same time). For example, if messages of the supported message types are known to be 32 bytes long, the compiler can further determine that message handlers will typically start at least four cycles apart, because it takes four cycles to transfer a message. Thus, the writes to the status queue would also typically be at least four cycles apart. Note that this padding technique also ensures that results are output in the same order that messages were received. In alternative application scenarios where such input-output ordering does not need to be maintained, a compiler may use other techniques to multiplex access to shared resources.

Note that in some embodiments the compiler may also be configured to consider interactions between the format decoder and the register file when generating the program instructions for message handlers. For instance, as described previously, a format decoder and a message handler may both access a register file at the same time, with the format decoder writing data into a register file at the same time that the message handler is accessing data from the register file. The compiler may need to generate program instructions that consider such scenarios. More specifically, the compiler may need to coordinate between the format decoder and the message handler to ensure both that the data that is (being read from message fields and) needed by the message handler is available when needed and that the register file traffic generated by message handler instructions (e.g., potentially multiple results being written into the register file from multiple busses) can also be stored correctly. Note that the compiler needs to ensure that the references to registers used by the format decoder correspond to those used by the message handler. For example, if the message handler has to operate on message field i, the compiler may generate an annotation for the format decoder that stores message field i into the register file (e.g., into register j) and then generate instructions for the message handler that read from register j to obtain the value of message field i.

Figure 29:
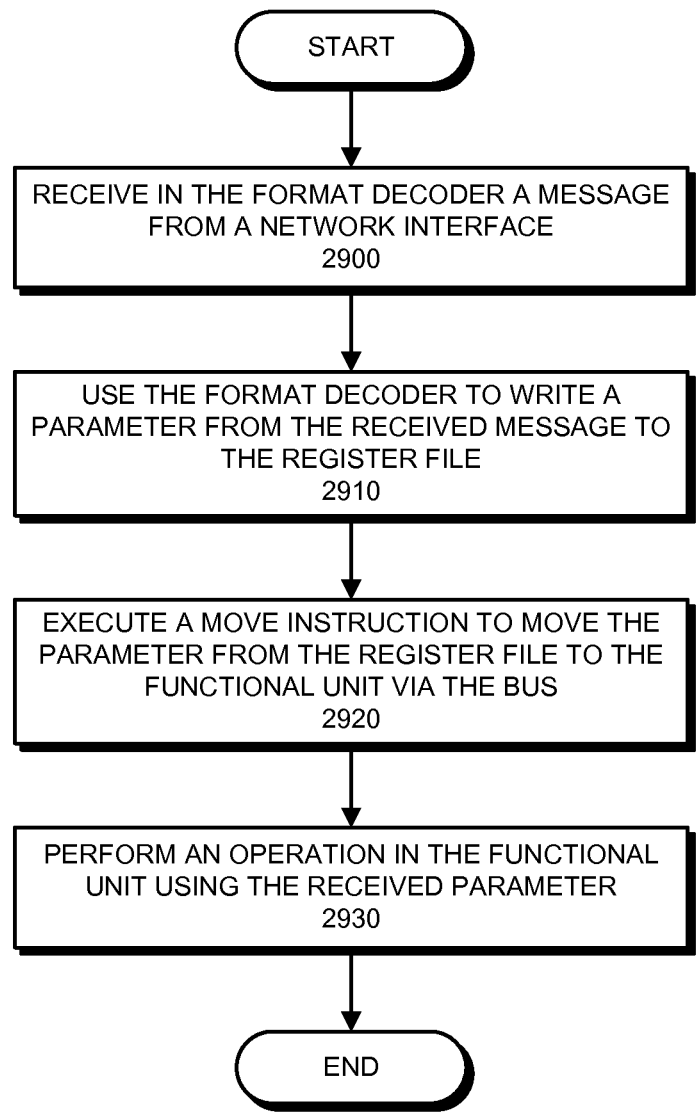
FIG. 29 presents a flow chart that illustrates the process of using a single-instruction processor to process messages in accordance with an embodiment.

FIG. 29 presents a flow chart that illustrates the process of using a single-instruction processor to process messages. During operation, a computing device that comprises a register file, a functional unit, a bus connecting the register file and the functional unit, and a format decoder receives in the format decoder unit a message from a network interface (operation 2900). The computing device uses the format decoder to write a parameter from the received message to the register file (operation 2910). The computing device then executes a move instruction to move the parameter from the register file to the functional unit via the bus (operation 2920). Upon receiving the parameter, the functional unit performs an operation using the parameter (operation 2930).

In summary, embodiments of the present invention comprise dynamic scheduling techniques that dynamically extract and store message fields for later processing by a message handler. Messages received from a network can be parallelized without any alignment constraints by using active parameters (e.g., annotations) that store (or otherwise initiate actions for) each given parameter that is needed by a subsequent message handler. The disclosed format decoders and application logic provide many of the performance benefits of dedicated hardware, but these active parameters and message handlers can be configured during operation using program instructions, thereby allowing the format decoders and the operations performed by the application logic to be re-configured during operation using program instructions to support additional message types and actions.

7. Computing Environment

Figure 30:
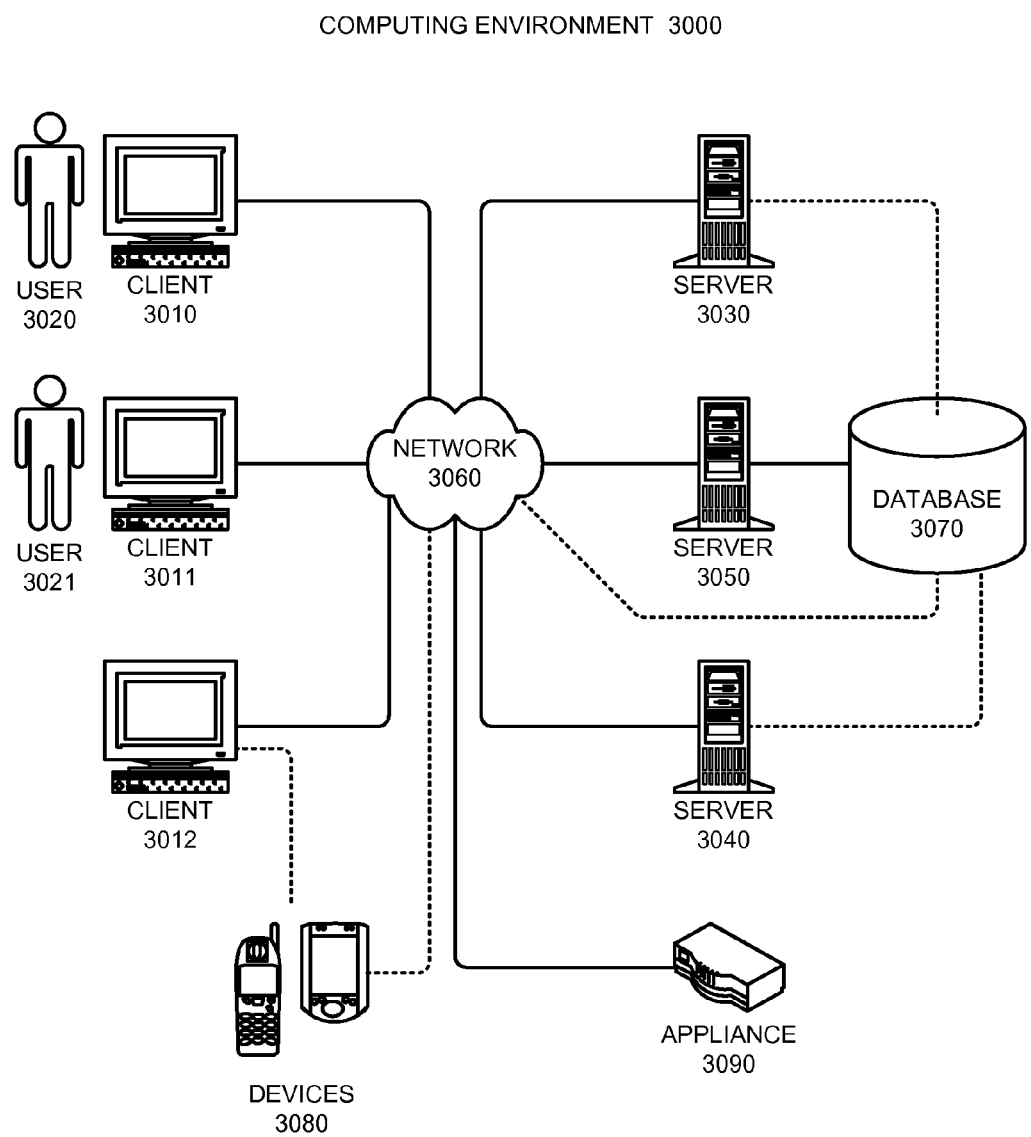
FIG. 30 illustrates a computing environment in accordance with an embodiment.

In some embodiments of the present invention, techniques for using annotations to extract parameters from messages can be incorporated into a wide range of computing devices in a computing environment. For example, FIG. 30 illustrates a computing environment 3000 in accordance with an embodiment of the present invention. Computing environment 3000 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 30, computing environment 3000 includes clients 3010-3012, users 3020 and 3021, servers 3030-3050, network 3060, database 3070, devices 3080, and appliance 3090.

Clients 3010-3012 can include any node on a network that includes computational capability and includes a mechanism for communicating across the network. Additionally, clients 3010-3012 may comprise a tier in an n-tier application architecture, wherein clients 3010-3012 perform as servers (servicing requests from lower tiers or users), and wherein clients 3010-3012 perform as clients (forwarding the requests to a higher tier).

Similarly, servers 3030-3050 can generally include any node on a network including a mechanism for servicing requests from a client for computational and/or data storage resources. Servers 3030-3050 can participate in an advanced computing cluster, or can act as stand-alone servers. For instance, computing environment 3000 can include a large number of compute nodes that are organized into a computing cluster and/or server farm. In one embodiment of the present invention, server 3040 is an online "hot spare" of server 3050. In other embodiments, servers 3030-3050 include coherent shared-memory multiprocessors.

Users 3020 and 3021 can include: an individual; a group of individuals; an organization; a group of organizations; a computing system; a group of computing systems; or any other entity that can interact with computing environment 3000.

Network 3060 can include any type of wired or wireless communication channel capable of coupling together computing nodes. This includes, but is not limited to, a local area network, a wide area network, or a combination of networks. In one embodiment of the present invention, network 3060 includes the Internet. In some embodiments of the present invention, network 3060 includes phone and cellular phone networks.

Database 3070 can include any type of system for storing data in non-volatile storage. This includes, but is not limited to, systems based upon magnetic, optical, or magneto-optical storage devices, as well as storage devices based on flash memory and/or battery-backed up memory. Note that database 3070 can be coupled: to a server (such as server 3050), to a client, or directly to a network.

Devices 3080 can include any type of electronic device that can be coupled to a client, such as client 3012. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 3080 can be coupled directly to network 3060 and can function in the same manner as clients 3010-3012.

Appliance 3090 can include any type of appliance that can be coupled to network 3060. This includes, but is not limited to, routers, switches, load balancers, network accelerators, and specialty processors. Appliance 3090 may act as a gateway, a proxy, or a translator between server 3040 and network 3060.

Note that different embodiments of the present invention may use different system configurations, and are not limited to the system configuration illustrated in computing environment 3000. In general, any device that receives a message may incorporate elements of the present invention.

In some embodiments of the present invention, some or all aspects of the disclosed techniques can be implemented as dedicated hardware modules in a computing device. These hardware modules can include, but are not limited to, processor chips, application-specific integrated circuit (ASIC) chips, field-programmable gate arrays (FPGAs), memory chips, and other programmable-logic devices now known or later developed.

Note that a processor can include one or more specialized circuits or structures that support using annotations to extract parameters from messages. Alternatively, some aspects of using annotations and extracting parameters from messages may be performed using general-purpose circuits that are configured using processor instructions.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A single-instruction processor, comprising:
a register file;
a functional unit;
a bus connecting the register file and the functional unit; and
a format decoder that is configured to receive messages from a network interface;
wherein the format decoder is configured to write a parameter from a received message to the register file;
wherein the single-instruction processor supports a single instruction type that specifies operands to be transferred via the bus, wherein the single instruction type comprises:
a first field that specifies a first source address in the register file for a first input operand;
a second field that specifies a first destination functional unit for the first input operand;
a third field that specifies a second source address in the register file for a second input operand;
a fourth field that specifies a second destination functional unit for the second input operand;
a fifth field that specifies a source functional unit for an output operand; and
a sixth field that specifies a destination address in the register file for the output operand;
wherein a move instruction of the single instruction type moves the parameter from the register file to the functional unit via the bus, wherein the move instruction moves the first input operand to a first port of the functional unit while simultaneously moving the second input operand to at least one of a second port of the functional unit or another functional unit and moving an output generated by at least one of the functional unit or another functional unit to the register file; and
wherein, upon receiving the parameter, the functional unit performs an operation using the parameter.

2. The single-instruction processor of claim 1,
wherein the single instruction type comprises a first field that specifies at least one of a source unit and a source address for an operand and a second field that specifies at least one of a destination unit and a destination address for the operand; and
wherein a subsequent move instruction moves an output generated by the operation to the register file via the bus.

3. The single-instruction processor of claim 1,
wherein the single-instruction processor further comprises a second bus;
wherein the first bus transfers input operands from the register file to one or more functional units;
wherein the second bus transfers output operands from the one or more functional units to the register file; and
wherein a two-bus architecture increases the number of move operations that can be performed in a single clock cycle and improves routability for the two busses.

4. The single-instruction processor of claim 3,
wherein the single instruction type comprises:
a first field that specifies a source address in the register file for an input operand;
a second field that specifies a destination functional unit for the input operand;
a third field that specifies a source functional unit for an output operand; and
a fourth field that specifies a destination address in the register file for the output operand; and
wherein the move instruction moves the input operand to the functional unit while simultaneously moving an output generated by at least one of the functional unit or another functional unit to the register file.

5. The single-instruction processor of claim 1,
wherein the single-instruction processor further comprises a second bus and a third bus;
wherein the first bus transfers input operands from the register file to a first port of one or more functional units;
wherein the second bus transfers input operands from the register file to a second port of one or more functional units;
wherein the third bus transfers output operands from the one or more functional units to the register file; and
wherein a three-bus architecture facilitates moving two input operands and one output operand in a single clock cycle.

6. The single-instruction processor of claim 1, wherein the register file is a split register file that is split such that a first portion of the register file is configured to output values to the first bus and a second portion of the register file is configured to output values to the second bus.

7. The single-instruction processor of claim 1,
wherein the single-instruction processor further comprises a memory;
wherein the format decoder is configured to determine a message type for the received message;
wherein the format decoder is further configured to use the message type to load a message handler for the received message from the memory; and
wherein the message handler comprises one or more move instructions.

8. The single-instruction processor of claim 7,
wherein the format decoder is further configured to use the message type to load an annotation for the received message from the memory;
wherein the format decoder outputs the annotation aligned with the bytes of the received message;
wherein the annotation includes an identifier for the message handler that is used to determine and load the message handler;
wherein the annotation comprises one or more register file addresses at which to store message bytes in the received message that contain the parameter; and
wherein the format decoder is further configured to use the annotation to extract and write the parameter in the register file.

9. The single-instruction processor of claim 8,
wherein the one or more move instructions of the message handler are statically scheduled by a compiler;
wherein the compiler is configured to consider the message format of the message type and the annotation for the message type when scheduling one or more operations for the message handler; and
wherein the operations of the message handler are configured to ensure that the parameter is available when needed by the operation.

10. The single-instruction processor of claim 9,
wherein the single-instruction processor is independent of any specific message format, protocols, or annotation formats, and can be adjusted to support new message types; and
wherein supporting a new message type comprises using a set of program instructions to:
store a new annotation for the new message type to the annotation memory;
select message fields in the new message type that are to be used as type identifier fields;
store a new identifier for a new message handler to be invoked for the new message type;
store an associated message length for the new message type that is used to detect the message boundary for the new message type; and
store a new message handler that performs operations for the new message type in a memory that stores message handlers.

11. The single-instruction processor of claim 10, wherein the single-instruction processor can be configured to support the new message type at runtime without changing the hardware of the single-instruction processor.

12. The single-instruction processor of claim 1, wherein multiple instances of the single-instruction processor are used in parallel to process multiple messages of an incoming message stream that is received from the network interface.

13. A computer-implemented method for using a single-instruction processor to process messages, wherein the single-instruction processor comprises a register file, a functional unit, a bus connecting the register file and the functional unit, and a format decoder that is configured to receive messages from a network interface, wherein the single-instruction processor supports a single instruction type that specifies operands to be transferred via the bus, the method comprising:
receiving in the format decoder a message from the network interface;
using the format decoder to write a parameter from the received message to the register file;
executing a move instruction of the single instruction type to move the parameter from the register file to the functional unit via the bus; and
upon receiving the parameter, performing an operation using the parameter in the functional unit;
wherein the single instruction type comprises:
a first field that specifies a first source address in the register file for a first input operand;
a second field that specifies a first destination functional unit for the first input operand;
a third field that specifies a second source address in the register file for a second input operand;
a fourth field that specifies a second destination functional unit for the second input operand;
a fifth field that specifies a source functional unit for an output operand; and
a sixth field that specifies a destination address in the register file for the output operand; and
wherein the move instruction moves the first input operand to a first port of the functional unit while simultaneously moving the second input operand to at least one of a second port of the functional unit or another functional unit and moving an output generated by at least one of the functional unit or another functional unit to the register file.

14. The computer-implemented method of claim 13,
wherein the single instruction type comprises a first field that specifies at least one of a source unit and a source address for an operand and a second field that specifies at least one of a destination unit and a destination address for the operand; and
wherein a subsequent move instruction moves an output generated by the operation to the register file via the bus.

15. The computer-implemented method of claim 13,
wherein the single-instruction processor further comprises a second bus;
wherein the first bus transfers input operands from the register file to one or more functional units;
wherein the second bus transfers output operands from the one or more functional units to the register file; and
wherein a two-bus architecture increases the number of move operations that can be performed in a single clock cycle and improves routability for the two busses.

16. The computer-implemented method of claim 15,
wherein the single instruction type comprises:
a first field that specifies a source address in the register file for an input operand;
a second field that specifies a destination functional unit for the input operand;
a third field that specifies a source functional unit for an output operand; and
a fourth field that specifies a destination address in the register file for the output operand; and wherein the move instruction moves the input operand to the functional unit while simultaneously moving an output generated by at least one of the functional unit or another functional unit to the register file.

17. The computer-implemented method of claim 13,
wherein the single-instruction processor further comprises a second bus and a third bus;
wherein the first bus transfers input operands from the register file to a first port of one or more functional units;
wherein the second bus transfers input operands from the register file to a second port of one or more functional units;
wherein the third bus transfers output operands from the one or more functional units to the register file; and
wherein a three-bus architecture facilitates moving two input operands and one output operand in a single clock cycle.

18. A non-transitory computer-readable storage medium storing instructions that when executed by a computer cause the computer to perform a method for using a single-instruction processor to process messages, wherein the single-instruction processor comprises a register file, a functional unit, a bus connecting the register file and the functional unit, and a format decoder that is configured to receive messages from a network interface, wherein the single-instruction processor supports a single instruction type that specifies operands to be transferred via the bus, the method comprising:
   receiving in the format decoder a message from the network interface;
   using the format decoder to write a parameter from the received message to the register file;
   executing a move instruction of the single instruction type to move the parameter from the register file to the functional unit via the bus; and
upon receiving the parameter, performing an operation using the parameter in the functional unit;
wherein the single instruction type comprises:
   a first field that specifies a first source address in the register file for a first input operand;
   a second field that specifies a first destination functional unit for the first input operand;
   a third field that specifies a second source address in the register file for a second input operand;
   a fourth field that specifies a second destination functional unit for the second input operand;
   a fifth field that specifies a source functional unit for an output operand; and
   a sixth field that specifies a destination address in the register file for the output operand; and
wherein the move instruction moves the first input operand to a first port of the functional unit while simultaneously moving the second input operand to at least one of a second port of the functional unit or another functional unit and moving an output generated by at least one of the functional unit or another functional unit to the register file.

19. The method of claim 18,
wherein the single instruction type comprises a first field that specifies at least one of a source unit and a source address for an operand and a second field that specifies at least one of a destination unit and a destination address for the operand; and
wherein a subsequent move instruction moves an output generated by the operation to the register file via the bus.

20. The method of claim 18,
wherein the single-instruction processor further comprises a second bus;
wherein the first bus transfers input operands from the register file to one or more functional units;
wherein the second bus transfers output operands from the one or more functional units to the register file; and
wherein a two-bus architecture increases the number of move operations that can be performed in a single clock cycle and improves routability for the two busses.

* * * * *